(12) United States Patent
Maas et al.

(10) Patent No.: US 10,854,192 B1
(45) Date of Patent: Dec. 1, 2020

(54) DOMAIN SPECIFIC ENDPOINTING

(71) Applicant: Amazon Technologies, Inc., Seattle, WA (US)

(72) Inventors: Roland Maas, Seattle, WA (US); Ariya Rastrow, Seattle, WA (US); Rohit Prasad, Acton, MA (US)

(73) Assignee: Amazon Technologies, Inc., Seattle, WA (US)

( * ) Notice: Subject to any disclaimer, the term of this patent is extended or adjusted under 35 U.S.C. 154(b) by 14 days.

(21) Appl. No.: 15/084,600

(22) Filed: Mar. 30, 2016

(51) Int. Cl.
*G10L 21/00* (2013.01)
*G10L 25/00* (2013.01)
(Continued)

(52) U.S. Cl.
CPC .............. *G10L 15/05* (2013.01); *G10L 15/26* (2013.01); *G10L 25/78* (2013.01); *G10L 2025/783* (2013.01)

(58) Field of Classification Search
CPC ... G10L 15/22; G10L 15/26; G10L 2015/088; G10L 2015/223; G10L 25/87; G10L 15/08; G10L 15/18; G10L 15/183; G10L 2025/783; G10L 25/78; G10L 15/04; G10L 15/1815; G10L 15/20; G10L 2015/228; G10L 2025/786; G10L 15/00; G10L 15/05; G10L 25/48; G10L 25/84; G10L 15/02; G10L 15/1822; G10L 17/02; G10L 17/04; G10L 25/51; G10L 15/065; G10L 17/16; G10L 2015/025; G10L 15/187; G10L 15/222; G10L 15/30; G10L 19/005; G10L 19/012; G10L 19/167; G10L 19/173; G10L 2021/02082; G10L 21/0232; G10L 21/0316; G10L 21/043; G10L 15/005; G10L 15/07; G10L 15/14; G10L 15/16; G10L 17/005; G10L 17/06; G10L 17/12; G10L 17/20; G10L 17/26; G10L 19/02; G10L 19/0212; G10L 19/022; G10L 19/12; G10L 19/22; G10L 2015/221; G10L 2021/065; G10L 21/003; G10L 21/0272;
(Continued)

(56) References Cited

U.S. PATENT DOCUMENTS 5,732,394 A * 3/1998 Nakadai ................. G10L 15/04
 704/238
6,405,168 B1 * 6/2002 Bayya ..................... G10L 15/07
 704/253
(Continued)

FOREIGN PATENT DOCUMENTS

EP 1610301 A2 * 12/2005 ............. G10L 15/05

OTHER PUBLICATIONS

Li, Q.; Zheng, J.; Tsai, A.; Zhou, Q. (2002). Robust endpoint detection and energy normalization for real-time speech and speaker recognition, IEEE Trans. Speech Audio Processing, vol. 10, No. 3, pp. 146-157.*
(Continued)

*Primary Examiner* — Michael Ortiz-Sanchez
(74) *Attorney, Agent, or Firm* — Pierce Atwood LLP

(57) ABSTRACT

An automatic speech recognition (ASR) system detects an endpoint of an utterance based on a domain of the utterance. The ASR system processes a first portion of the utterance to determine the domain and then determines an endpoint of the remainder of the utterance depending on the domain.

18 Claims, 13 Drawing Sheets

(51) Int. Cl.
*G10L 15/05* (2013.01)
*G10L 25/78* (2013.01)
*G10L 15/26* (2006.01)

(58) Field of Classification Search
CPC ..... G10L 21/0332; G10L 21/04; G10L 25/18;
G10L 25/24; G10L 25/30; G10L 25/60;
G10L 25/63; G10L 25/69; G10L 25/90;
G06F 17/30424; G06F 17/30707; G06F
17/30876; G06F 40/205; G06F 40/30;
G06F 16/2365; G06F 16/35; G06F
16/9535; G06F 40/226; G06F 16/243;
G06F 16/2457; G06F 16/2468; G06F
16/248; G06F 16/3344; G06F 16/951;
G06F 3/0412; G06F 40/289; G06F 3/165;
G06F 3/16; G06F 11/00; G06F 11/0745;
G06F 11/0763; G06F 12/08; G06F
16/2343; G06F 2203/014; G06F 3/016;
G06F 3/0416; G06F 3/04842; G06F
3/0488; G06F 40/149; G06F 9/526; G06F
13/38; G06F 16/2379; G06F 16/244;
G06F 16/29; G06F 16/3331; G06F
16/3334; G06F 16/335; G06F 16/345;
G06F 16/367; G06F 16/61; G06F 16/685;
G06F 16/686; G06F 16/9024; G06F
16/90324; G06F 16/90332; G06F 1/3212;
G06F 1/324; G06F 1/3275; G06F 1/3287;
G06F 3/012; G06F 3/013; G06F 40/169;
G06F 40/20; G06F 40/247; G06F 40/284;
G06F 40/58; G06F 8/10; G06F 8/20;
G06F 8/30; G06F 8/35; G06F 9/4406;
G06F 9/4413; H04M 2201/40
See application file for complete search history.

(56) References Cited

U.S. PATENT DOCUMENTS

| | | | | |
|---|---|---|---|---|
| 6,594,630 B1* | 7/2003 | Zlokarnik | ........... | G10L 15/26 704/256.5 |
| 6,873,953 B1* | 3/2005 | Lennig | ........... | G10L 25/87 704/248 |
| 7,277,853 B1* | 10/2007 | Bou-Ghazale | ........... | G10L 25/87 704/248 |
| 8,650,029 B2* | 2/2014 | Thambiratnam | ........... | G10L 25/84 704/200 |
| 8,650,031 B1* | 2/2014 | Mamou | ........... | G10L 15/08 704/2 |
| 8,775,191 B1* | 7/2014 | Sharifi | ........... | G10L 15/26 704/275 |
| 9,437,186 B1* | 9/2016 | Liu | ........... | G10L 15/05 |
| 9,484,030 B1* | 11/2016 | Meaney | ........... | G10L 15/22 |
| 9,558,740 B1* | 1/2017 | Mairesse | ........... | G10L 15/08 |
| 2004/0015352 A1* | 1/2004 | Ramakrishnan | ........... | G10L 25/78 704/240 |
| 2004/0064314 A1* | 4/2004 | Aubert | ........... | G10L 25/87 704/233 |
| 2005/0108012 A1* | 5/2005 | Roth | ........... | G10L 15/08 704/252 |
| 2005/0216261 A1* | 9/2005 | Garner | ........... | G10L 25/87 704/215 |
| 2006/0009974 A1* | 1/2006 | Junqua | ........... | G10L 15/083 704/257 |
| 2006/0173680 A1* | 8/2006 | Verhasselt | ........... | G10L 15/22 704/235 |
| 2008/0015864 A1* | 1/2008 | Ross | ........... | G10L 15/1822 704/275 |
| 2009/0313016 A1* | 12/2009 | Cevik | ........... | G10L 15/22 704/241 |
| 2010/0191524 A1* | 7/2010 | Washio | ........... | G10L 25/78 704/207 |
| 2010/0223056 A1* | 9/2010 | Kadirkamanathan | ... | G10L 13/08 704/235 |
| 2011/0301943 A1* | 12/2011 | Patch | ........... | G10L 15/265 704/9 |
| 2014/0163959 A1* | 6/2014 | Hebert | ........... | G06F 17/30684 704/9 |
| 2014/0169795 A1* | 6/2014 | Clough | ........... | G06F 19/3418 398/106 |
| 2014/0249812 A1* | 9/2014 | Bou-Ghazale | ........... | G10L 25/84 704/233 |
| 2014/0379334 A1* | 12/2014 | Fry | ........... | G10L 15/22 704/235 |
| 2016/0034571 A1* | 2/2016 | Setayesh | ........... | G06F 17/2785 707/738 |
| 2016/0117360 A1* | 4/2016 | Kunc | ........... | G06F 17/30401 707/730 |
| 2016/0358598 A1* | 12/2016 | Williams | ........... | G10L 15/04 |
| 2016/0379632 A1* | 12/2016 | Hoffmeister | ........... | G10L 15/18 704/253 |
| 2017/0110118 A1* | 4/2017 | Tadpatrikar | ........... | G06F 16/685 |
| 2018/0090127 A1* | 3/2018 | Hofer | ........... | G10L 15/04 |

OTHER PUBLICATIONS

Domain-Specific Utterance End-Point Detection for Speech Recognition R Maas, A Rastrow, K Goehner, G Tiwari, S Joseph . . . -2017.*

* cited by examiner

FIG. 5
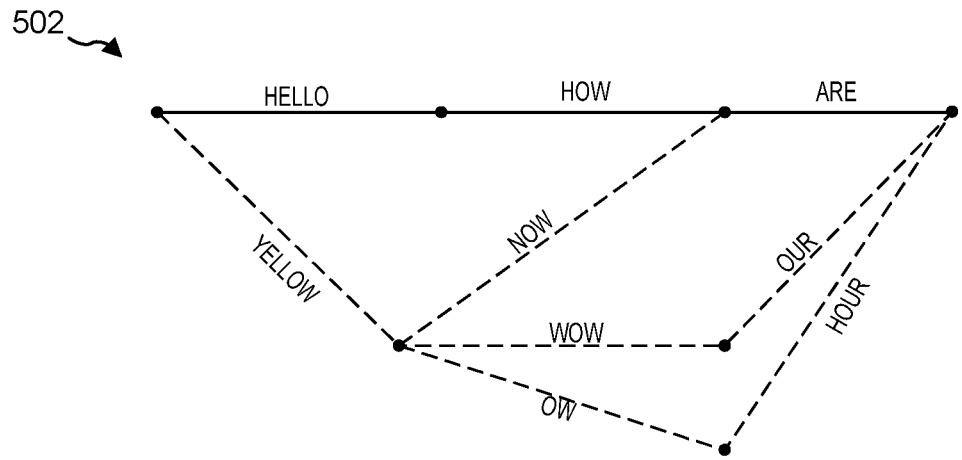
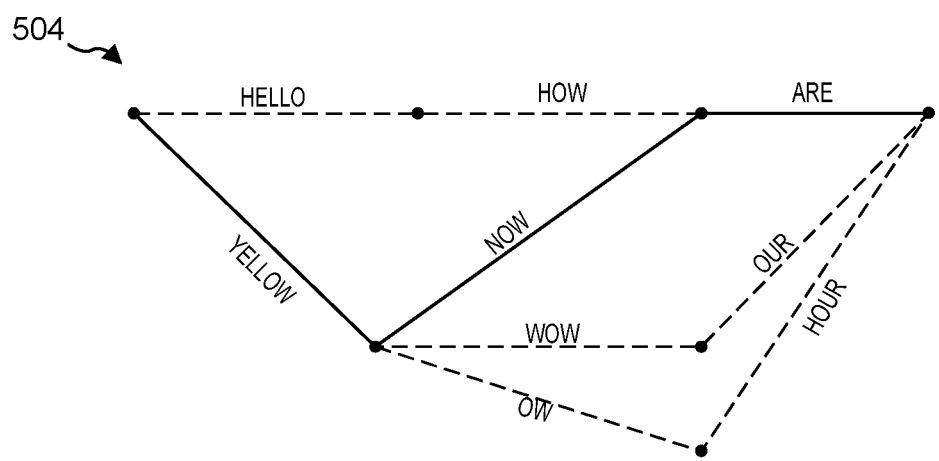
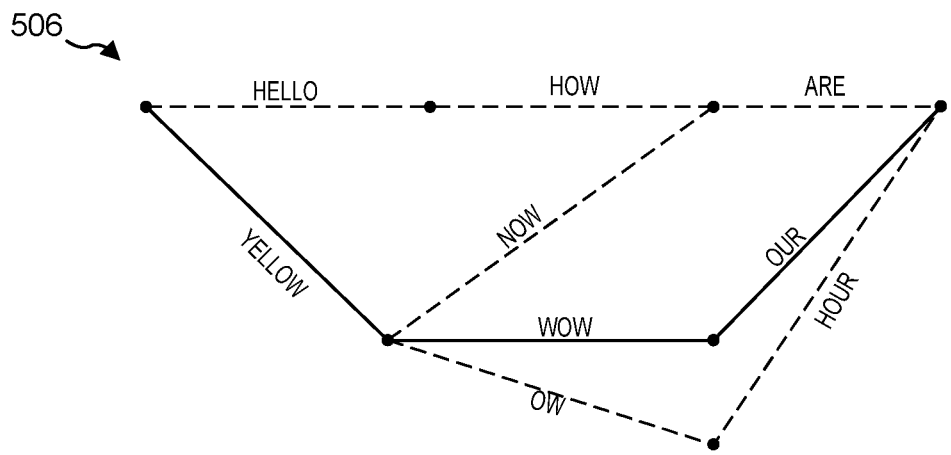

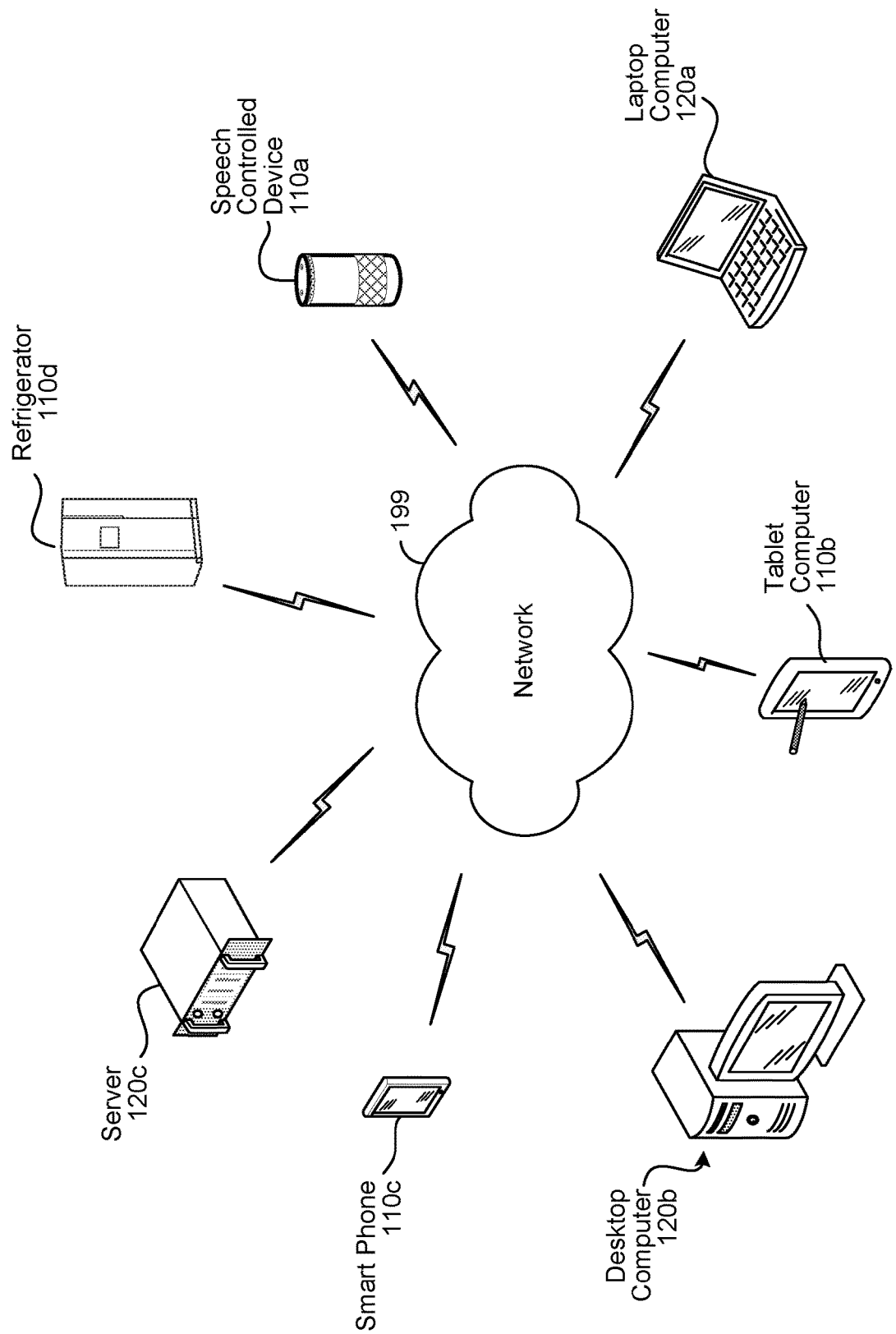

US 10,854,192 B1

DOMAIN SPECIFIC ENDPOINTING

BACKGROUND

Speech recognition systems have progressed to the point where humans can interact with computing devices by relying on speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is sometimes referred to herein as speech processing. Speech processing may also include converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 5 illustrates speech recognition lattices according to one aspect of the present disclosure.

FIG. 13 illustrates an example of a computer network for use with the system.

DETAILED DESCRIPTION

Figure 1:
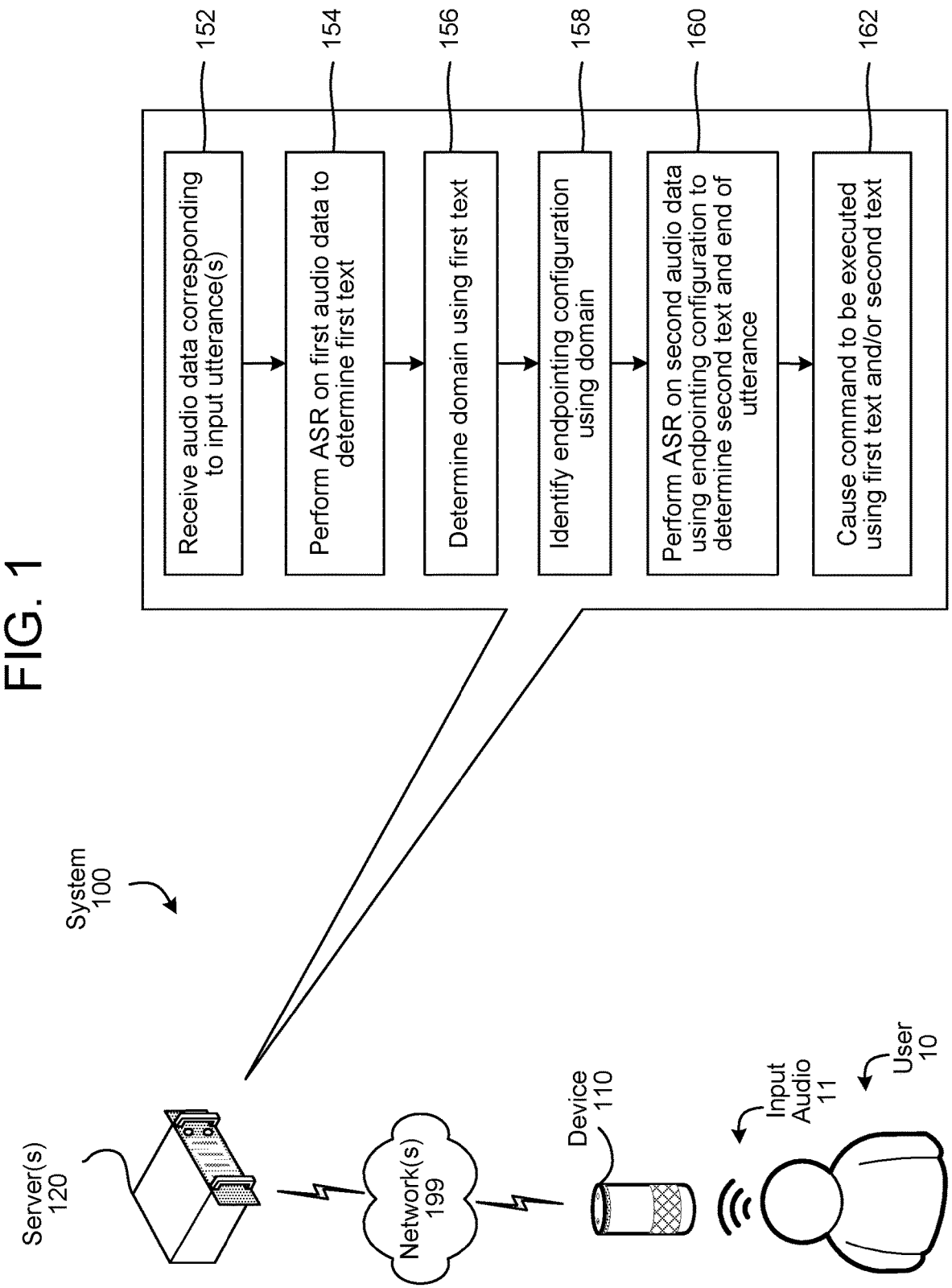
FIG. 1 illustrates a system for automatic speech recognition (ASR) according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system.

ASR and NLU can be computationally expensive. That is, significant computing resources may be needed to process ASR and NLU processing within a reasonable time frame. Because of this, a distributed computing environment may be used when performing speech processing. An example of such a distributed environment may include a local device having one or more microphones, where the local device is configured to capture sounds from a user speaking and convert those sounds into an audio signal. The audio signal may then be sent to a remote device for further processing, such as transforming the audio signal into a command for one or more remotely located machines (such as a command to generate and send a text or other type of message). The command may then be executed by a combination of remote and local devices depending on the command itself.

As part of a distributed speech processing system, a local device may be configured to continuously send all detected audio to the remote device. There are several drawbacks to such an approach. One drawback is that such communications would require significant bandwidth and networking resources. Another drawback to such an approach is that privacy concerns may make it undesirable for a local device to send all captured audio to a remote device. A still further drawback is that a remote device may waste significant computing resources processing all incoming audio when no commands are being issued in the majority of the audio.

To account for these problems, a local device may be configured to only activate upon a user speaking a particular waking command to wake the local device so the user may speak a further command. The waking command (which may be referred to as a wakeword), may include an indication for the system to perform further processing. The local device may continually listen for the wakeword and may disregard any audio detected that does not include the wakeword. Typically, systems are configured to detect a wakeword, and then process any subsequent audio following the wakeword (plus perhaps a fixed, but short amount of audio pre-wakeword) to detect any commands in the subsequent audio. As an example, a wakeword may include a name by which a user refers to a device. Thus, if the device was named "Alexa," and the wakeword was "Alexa," a user may command a voice controlled device to play music by saying "Alexa, play some music." The device, recognizing the wakeword "Alexa" would understand the subsequent audio (in this example, "play some music") to include a command of some sort and would perform speech processing on that audio to determine what the command is for execution. Provided services/commands may include performing actions or activities, rendering media, obtaining and/or providing information, providing information via generated or synthesized speech via a local device, initiating Internet-based services on behalf of the user, and so forth.

To determine when to stop processing audio data, a process called endpointing may be used. In some embodiments, endpointing techniques can rely on a fixed duration of pause detected in the audio data, declaring an utterance to be complete when the pause duration has been reached. Such techniques, however, may be imprecise and may lead to errors, particularly when a user is speaking a particular command that may result in the user pausing in mid-sentence, only to resume shortly thereafter.

Offered are technical improvements, where the system determines a domain (e.g., subject matter, command type, etc.) of the incoming utterance and determines an endpointing configuration based on the domain. Then the system can determine the utterance is complete based on particular settings regarding the type of the command being spoken by a user. Thus, processing of a particular hypothesis may be considered to have reached an endpoint based on a domain specific endpointing configuration.

FIG. 1 illustrates an example system such as the one described above. As illustrated, a system 100 may include a speech controlled device 110 at the location of a user 10. The device 110 may be connected over a network 199 to one or more server(s) 120. The system 100 may be a distributed speech processing system where the device 110 captures audio spoken by the user 10 and the server(s) perform speech processing on the audio as described below in reference to FIG. 2. As shown, a server 120 receives (152) audio data corresponding to at least one input utterance from a local device 110. The server 120 then performs (154) ASR on the first audio data to determine first text. The system may then determine (156) a domain corresponding to the utterance using the first text. For example, the system may determine that the first text corresponds to a particular command to be executed by the system corresponding to a particular domain. The system may then identify (158) endpointing configuration information using the domain. The server may then perform (160) ASR on the second audio data using the identified domain-specific endpointing configuration to determine the end of the utterance of the second audio data. During ASR the system also determines second text corresponding to the second audio data. The system may then cause a command to be executed (162) using some combination of the first text and second text. As discussed below, the first audio data and second audio data may correspond, respectively, to a first portion of audio data and a second portion of audio data of a single utterance. Alternatively, the first audio data and second audio data may correspond, respectively, to a first utterance and second utterance that correspond to a single command to be executed by the system.

Figure 2:
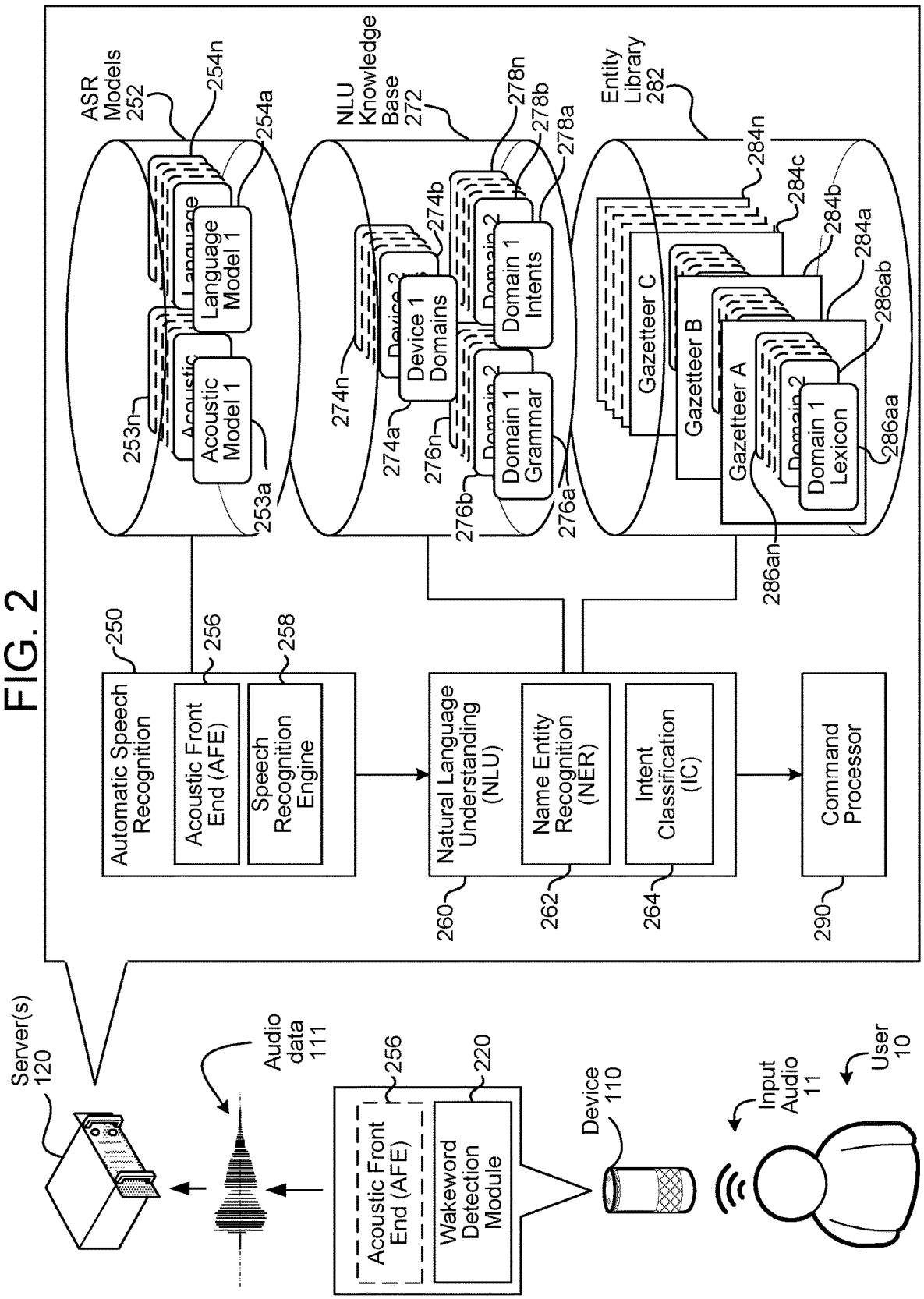
FIG. 2 is a conceptual diagram of how a spoken utterance may be processed according to embodiments of the present disclosure.

The system 100 of FIG. 1 may operate using various speech processing components as described in FIG. 2. FIG. 2 is a conceptual diagram of how a spoken utterance is processed. The various components illustrated may be located on a same or different physical devices. Communication between various components illustrated in FIG. 2 may occur directly or across a network 199. The system may include a device 110, which may be a general purpose device (such as a mobile phone, tablet, etc.) or a specific purposes device such as an audio device configured to receive spoken commands and output audio. Although the teachings below apply to many different types of devices 110, for present purposes operation of the system may be illustrated using the example of an audio device 110. The audio device 110 may be configured to receive and output audio corresponding to a plurality of applications that are configured to work in conjunction with other elements of the system 100 to provide services and functionality. For example, the device 110 may be configured to stream media playback services, such as music playback, from server(s) 120. Other services or operations performed or provided by the applications may include, as examples, requesting and consuming entertainment (e.g., gaming, finding and playing music, movies or other content, etc.), personal management (e.g., calendaring, note taking, etc.), online shopping, financial transactions, database inquiries, and so forth.

To perform speech processing a spoken utterance may be captured and sent to an ASR component 250. The ASR component 250 may be local to the audio device 110 and/or located on a remote server 120. The ASR component 250 converts the audio into text. The ASR component 250 thus transcribes audio data into text data representing the words of the speech contained in the audio data. The text data may then be used by other downstream components for various purposes, such as executing system commands, inputting data, etc. The downstream component may be any number of components or applications that operate on ASR output. Although many such downstream applications are envisioned for these techniques, for purposes of illustration this description will use an NLU process and application as the NLU process illustrates the benefits of early ASR output as described below. For example, the NLU process may take ASR output and determine, for example, the actions (sometimes referred to as a command, "application response" or "app response") based on the recognized speech of the early ASR output. A particular command or action may be considered as belonging to a domain, i.e., subject matter of the utterance. For example, a command may relate to a music domain, messaging domain, banking domain, information query domain, or the like. Many such domains and commands may be handled by the system.

To process a spoken user command, an audio capture component, such as a microphone of the audio device 110, captures audio corresponding to a spoken utterance. Details for capturing the spoken utterance, such as determining the beginning and/or end of the utterance and configuring an audio signal corresponding to the utterance, is discussed below. An audio capture component, such as a microphone of device 110, captures audio 11 corresponding to a spoken utterance. The device 110, using a wakeword detection module 220, then processes the audio, or audio data corresponding to the audio, to determine if a keyword (such as a wakeword) is detected in the audio. Following detection of a wakeword, the device sends audio data 111 corresponding to the utterance, to a server 120 that includes an ASR module 250. The audio data 111 may be output from an acoustic front end (AFE) 256 located on the device 110 prior to transmission. Or the audio data 111 may be in a different form for processing by a remote AFE 256, such as the AFE 256 located with the ASR module 250.

The wakeword detection module 220 works in conjunction with other components of the device, for example a microphone (not pictured) to detect keywords in audio 11. For example, the device 110 may convert audio 11 into audio data, and process the audio data with the wakeword detection module 220 to determine whether speech is detected, and if so, if the audio data comprising speech matches an audio signature and/or model corresponding to a particular keyword.

Once speech is detected in the audio received by the device 110 (as described further below), or separately from speech detection, the device 110 may use the wakeword detection module 220 to perform wakeword detection to determine when a user intends to speak a command to the device 110. This process may also be referred to as keyword detection, with the wakeword being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 220 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the wakeword spotting system may be built on deep neural network (DNN)/recurrent neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 110 may "wake" and begin transmitting audio data 111 corresponding to input audio 11 to the server(s) 120 for speech processing. Audio data corresponding to that audio may be sent to a server 120 for routing to a recipient device or may be sent to the server for speech processing for interpretation of the included speech (either for purposes of enabling voice-communications and/or for purposes of executing a command in the speech). The audio data 111 may include data corresponding to the wakeword, or the portion of the audio data corresponding to the wakeword may be removed by the local device 110 prior to sending. Upon receipt by the server(s) 120, an ASR module 250 may convert the audio data 111 into text. The ASR transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model knowledge base (ASR Models Storage 252). For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model or dialog-based interactive voice response (IVR) system)). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR process 250 may include an acoustic front end (AFE) 256 and a speech recognition engine/decoder 258. The acoustic front end (AFE) 256 transforms the audio data from the microphone into data for processing by the speech recognition engine. The speech recognition engine 258 compares the speech recognition data with acoustic models 253, language models 254, and other data models and information for recognizing the speech conveyed in the audio data. The AFE may reduce noise in the audio data and divide the digitized audio data into frames representing a time intervals for which the AFE determines a set of values, called a feature vector, representing the features/qualities of the utterance portion within the frame. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. The AFE 256 may be located on a device 110 or on a server 120. If on a device 110, the device may send the output of the AFE, such as the feature vectors, over a network 199 to the server 120 for further processing.

The speech recognition engine 258 may process the output from the AFE 256 with reference to information stored in speech/model storage (252). Alternatively, post front-end processed data (such as feature vectors) may be received by the device executing ASR processing from another source besides the internal AFE. For example, the appliance 110 may process audio data into feature vectors and transmit that information to a server across a network 199 for ASR processing. Feature vectors may arrive at the server encoded, in which case they may be decoded prior to processing by the processor executing the speech recognition engine 258. A sliding window technique may be used to determine feature vectors for processing. For example, each frame of audio may be 25 milliseconds (ms) long, but a next audio frame starts 10 ms from the end of the previous frame. Thus audio data from a certain point in time may appear in multiple frames. A fast-Fourier transform (FFT) may be applied to obtain a short-term magnitude spectrum corresponding to the frame. Then feature values for the frame data may be determined, for example by applying filter banks to obtain feature values, which may then be included in a feature vector corresponding to the audio frame. One or more feature vectors may correspond to a single frame. Other techniques for obtaining feature vectors may also be used.

The speech recognition engine 258 attempts to match received feature vectors to language phonemes and words as known in the stored acoustic models 253 and language models 254. The speech recognition engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Instead of (or in addition to) phonemes, senons may be used as an acoustic unit. A senon is an acoustic realization of a phoneme. Each phoneme may have a number of different sounds depending on its context (e.g., the surrounding phonemes). While English may have approximately 50 phonemes it has several thousand senons. Use of senons in ASR processing may allow for improved ASR results.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as server 120, for natural language understanding (NLU) processing, such as conversion of the text into commands for execution, either by the device 110, by the server 120, or by another device (such as a server running a search engine, etc.)

The device performing NLU processing 260 (e.g., server 120) may include various components, including potentially dedicated processor(s), memory, storage, etc. A device configured for NLU processing may include a named entity recognition (NER) module 252 and intent classification (IC) module 264, a result ranking and distribution module 266, and knowledge base 272. The NLU process may also utilize gazetteer information (284a-284n) stored in entity library storage 282. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

The NLU process takes textual input (such as processed from ASR 250 based on the utterance 11) and attempts to make a semantic interpretation of the text. That is, the NLU process determines the meaning behind the text based on the individual words and then implements that meaning. NLU processing 260 interprets a text string to derive an intent or a desired action from the user as well as the pertinent pieces of information in the text that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom."

The NLU may process several textual inputs related to the same utterance. For example, if the ASR 250 outputs N text segments (as part of an N-best list), the NLU may process all N outputs to obtain NLU results.

As will be discussed further below, the NLU process may be configured to parsed and tagged to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result).

To correctly perform NLU processing of speech input, the NLU process 260 may be configured to determine a "domain" of the utterance so as to determine and narrow down which services offered by the endpoint device (e.g., server 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The name entity recognition module 262 receives a query in the form of ASR results and attempts to identify relevant grammars and lexical information that may be used to construe meaning. To do so, a name entity recognition module 262 may begin by identifying potential domains that may relate to the received query. The NLU knowledge base 272 includes a databases of devices (274a-274n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, User ID, or Household ID, or some other indicator.

A domain may represent a discrete set of activities having a common theme, such as "messaging," "shopping", "music", "calendaring", etc. As such, each domain may be associated with a particular language model and/or grammar database (276a-276n), a particular set of intents/actions (278a-278n), and a particular personalized lexicon (286). As noted below with reference to FIG. 7, each domain may also be associated with particular settings/models for performing endpointing. Each gazetteer (284a-284n) may include domain-indexed lexical information associated with a particular user and/or device. For example, the Gazetteer A (284a) includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

A query is processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result.

An intent classification (IC) module 264 parses the query to determine an intent or intents for each identified domain, where the intent corresponds to the action to be performed that is responsive to the query. Each domain is associated with a database (278a-278n) of words linked to intents. For example, a music intent database may link words and phrases such as "quiet," "volume off," and "mute" to a "mute" intent. The IC module 264 identifies potential intents for each identified domain by comparing words in the query to the words and phrases in the intents database 278.

In order to generate a particular interpreted response, the NER 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC module 264 are linked to domain-specific grammar frameworks (included in 276) with "slots" or "fields" to be filled. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER module 260 may parse the query to identify words as subject, object, verb, preposition, etc., based on grammar rules and models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 260 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. No determination has been made as to the meaning of "mother's little helper" and "the rolling stones," but based on grammar rules and models, it is determined that these phrase relate to the grammatical object of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NER module 262 may search the database of generic words associated with the domain (in the NLU's knowledge base 272). So for instance, if the query was "play songs by the rolling stones," after failing to determine an album name or song name called "songs" by "the rolling stones," the NER 262 may search the domain vocabulary for the word "songs." In the alternative, generic words may be checked before the gazetteer information, or both may be tried, potentially producing two different results.

The comparison process used by the NER module 262 may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

The NER modules 262 may also use contextual operational rules to fill slots. For example, if a user had previously requested to pause a particular song and thereafter requested that the voice-controlled device to "please un-pause my music," the NER module 262 may apply an inference-based rule to fill a slot associated with the name of the song that the user currently wishes to play—namely the song that was playing at the time that the user requested to pause the music.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing (which may include tagged text, commands, etc.) may then be sent to a command processor 290, which may be located on a same or separate server 120 as part of system 100. The destination command processor 290 may be determined based on the NLU output. For example, if the NLU output includes a command to play music, the destination command processor 290 may be a music playing application, such as one located on audio device 110 or in a music playing appliance, configured to execute a music playing command. The server may configure data corresponding to the command included in the utterance (which may be referred to as utterance command data). Depending on system configuration the utterance command data may be created by and output from the NLU 260, in which case the command may be executed by the command processor 290 (located either on the server 120, device 110, or located elsewhere), or the utterance command data may be created by and output from the command processor 290, in which case the utterance command data may be sent to a downstream component.

Turning now to the identification of speech within the audio data 111, for example the system 100 may use various techniques for determining the beginning and end of speech to be processed. For purposes of illustration, in system 100 the beginpoint of speech is described as determined by the device 110 and the endpoint of the speech is described as determined by the server 120 (after receipt of corresponding audio data from the device 110), but different components may perform the beginpointing/endpointing without diverging from the present disclosure.

Once speech is detected in the audio received by the device 110, the device may perform wakeword detection to determine when a user intends to speak a command to the device 110. As noted above, a wakeword is a special word that the device 110 is configured to recognize among the various audio inputs detected by the device 110. The wakeword is thus typically followed by a command to be executed by the device 110 and/or overall system 100. Following detection of the wakeword the device 110 may send audio data corresponding to the utterance (which may include the wakeword itself) to the server(s) 120. The server(s) 120 may then perform speech processing on the audio data 111 until an endpoint is detected (discussed below) and may also and execute any resulting command included in the utterance.

To determine the beginning or end of an audio command, a number of techniques may be used. In one embodiment the system may determine pauses in spoken words and may interpret those pauses as potential breaks in a conversation. Thus, while the discussion herein may refer to determining or declaring an endpoint, what the system does is estimate that a spoken command has ended (i.e., reached an endpoint) based on the various considerations described herein. Breaks in a conversation may be considered as breaks between utterances and thus considered the beginning (beginpoint) or end (endpoint) of an utterance. The beginning/end of an utterance may also be detected using speech/voice characteristics. Other techniques may also be used to determine the beginning of an utterance (also called beginpointing) or end of an utterance (endpointing). Beginpointing/endpointing may be based, for example, on the number of silence/non-speech audio frames, for instance the number of consecutive silence/non-speech frames. For example, some systems may employ energy based or acoustic model based voice activity detection (VAD) techniques. Such techniques may determine whether speech is present in an audio input based on various quantitative aspects of the audio input, such as the spectral slope between one or more frames of the audio input; the energy levels (such as a volume, intensity, amplitude, etc.) of the audio input in one or more spectral bands; zero-crossing rate; the signal-to-noise ratios of the audio input in one or more spectral bands; or other quantitative aspects. These factors may be compared to one or more thresholds to determine if a break in speech has occurred that qualifies as a beginpoint/endpoint. Such thresholds may be set according to user input, or may be set by a device. In some embodiments, the beginpointing/endpointing may be further configured to determine that the audio input has an energy level satisfying a threshold for at least a threshold duration of time. In such embodiments, high-energy audio inputs of relatively short duration, which may correspond to sudden noises that are relatively unlikely to include speech, may be ignored. The beginpointing/endpointing may compare the energy level to the energy level threshold (and optionally to the threshold duration) to determine whether the energy level threshold is met.

In certain embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence/non-speech. Non-speech frames may not necessarily represent complete silence (for example, certain noise may still be present in the audio), but the frames may lack acoustic characteristics typical of speech and thus may be deemed to be non-speech frames. Still other techniques may be used to determine whether speech begins/ends in the input audio data.

Various machine learning techniques may be used to determine a beginning of an utterance or an end of an utterance as discussed above. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagati on, statistical learning, supervised learning, semi-supervised learning, stochastic learning, or other known techniques. Many different training example utterances may be used during training.

Training examples of sample utterance audio along with labeled ground truths about utterance beginnings, utterance conclusions, existence/lengths of pauses, etc. may be used to training machine learning models for use at runtime to make such determinations. Further, tags representing the length of pauses and semantic content of potential utterances may be identified and inserted in the training data for use when training a model. During run time processing, the model and sematic tags representing the length of pauses in speech may be used to determine, for example, the likelihood that the system should await more speech before determining the end of an utterance. Depending on the determination, the number of frames of non-speech that may be processed before the beginning of the utterance is established is adjusted. The number of non-speech frames prior to detected speech may determine when the device/system determines the beginning or end of an utterance.

The length of a pause sufficient to qualify the pause as a beginpoint/endpoint may depend on the identity of the speaker. If the system is configured to perform speaker identification (techniques for which are known in the art), the system may identify the speaker and adjust the pause length sufficient to determine an endpoint accordingly. The system may also be configured to learn pause tendencies of different speakers and to adjust its endpointing processing accordingly. For example, during system training/enrollment, a speaker's pause tendencies between utterances or between topics may be recorded and used to train the endpointing processing of the system. Such tendencies may also be recorded at runtime and used to further adjust the system. Different pause lengths may also be configured for different spoken languages as the pause length may vary depending on the language spoken (for example pauses in conversational English may be different from pauses in conversational Spanish). The begin/end of an utterance may also be determined by various characteristics of the speech including pitch, prosody, volume, rhythm, stress, intonation, cepstrum, etc. of the speech which may be determined by audio and/or speech processing components of the device. For example, a rising or falling tone of a voice may indicate a new utterance, the end of a command, etc. The system may train on voice characteristics (which may or may not be also tied to speaker identity) that indicate when an utterance ends, and thus when an end of the speech should be marked by the system. These techniques may be used to modify/customize the language models discussed above, such that expected pauses in the language model(s) may be based on an identity of a speaker.

Using variations of the techniques described above, the beginpointing/endpointing may determine a confidence level whose value corresponds to a likelihood that the location of the point in question (i.e., the point in the audio data at which the beginpointing/endpointing occurs) represents the start/end of an utterance/command. The confidence score may depend on factors such as the technique used to determine the marker, the length of the pause, the speaker identity, etc. For example, if the confidence level satisfies a confidence level threshold, it may be determined that a detected silence is sufficient (e.g., the length of a pause in the speech exceeds a threshold), that speech is present in the audio input, and that an utterance begin/end may be marked. However, if the confidence level does not satisfy the confidence level the system may determine that there is no speech in the audio input.

Once a wakeword/beginpoint is detected, the device 110 may begin sending audio data to the server 120. The server 120 will continue speech processing on the audio data until an endpoint is detected. The audio data from the beginpoint to the endpoint is thus considered by the system 100 when performing the speech processing for the utterance.

In certain configurations, the process for endpointing has been similar to the process for beginpointing as discussed above. One difference between endpointing and beginpointing, however, is that during endpointing, the system has some knowledge of the contents of the utterance that is being endpointed. Thus, while beginpointing may sometimes occur when there is no prior speech, endpointing occurs when there is prior speech, namely the speech of the utterance whose endpoint is being detected.

Further, one drawback to certain VAD or other techniques that rely solely on pause length, is that they have difficulty distinguishing between mid-utterance pauses, and pauses that truly indicate the end of an utterance. Further, certain systems may encounter difficulty in noisy environments where separating speech from noise impacts proper pause detection.

Offered a speech processing system that makes use of the content of speech when determining an endpoint of the utterance. The present system considers the domain or particular command being executed in the speech when determining an endpoint. This system technically improves on VAD or other techniques that rely simply on pause length and thus improves the system's ability to distinguish between mid-utterance pauses (which may be particular to utterances of a particular domain) and end of utterance pauses. The ASR module may perform a certain amount of speech processing on an utterance, determine a domain from that amount of processing, then configure an endpoint setting based on the domain. An endpoint detector may determine an endpoint using the domain specific endpoint setting and the remainder of the utterance. The endpoint detector may determine an endpoint based on different hypotheses determined by the speech recognition engine 258. Based on an individual hypothesis, the system determines an expected pause length over multiple active speech hypotheses and whether the actual pause length matches the averaged expected pause length for an utterance of the particular domain for purposes of declaring an endpoint. By considering active hypotheses, which include a sentence end, the system can more robustly distinguish between expected within and end-of sentence pause duration.

To understanding the application of domain specific endpointing, some further data is provided below regarding detailed operation of the speech recognition engine 258.

As noted above, during speech recognition, an ASR module 250/speech recognition engine 258 may utilize acoustic models 253 to determine possible phonemes or other phonetic units that match the incoming audio data feature vectors. The probable phonemes and related states/state transitions, for example HMM states, may be formed into paths traversing a lattice of potential phonemes. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. This process of determining scores based on the feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 258 may also compute scores of branches of the paths based on language models or grammars. Language modeling involves determining scores for what words are likely to be used together to form coherent words and sentences. Application of a language model may improve the likelihood that the ASR module 250 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

Figure 3:
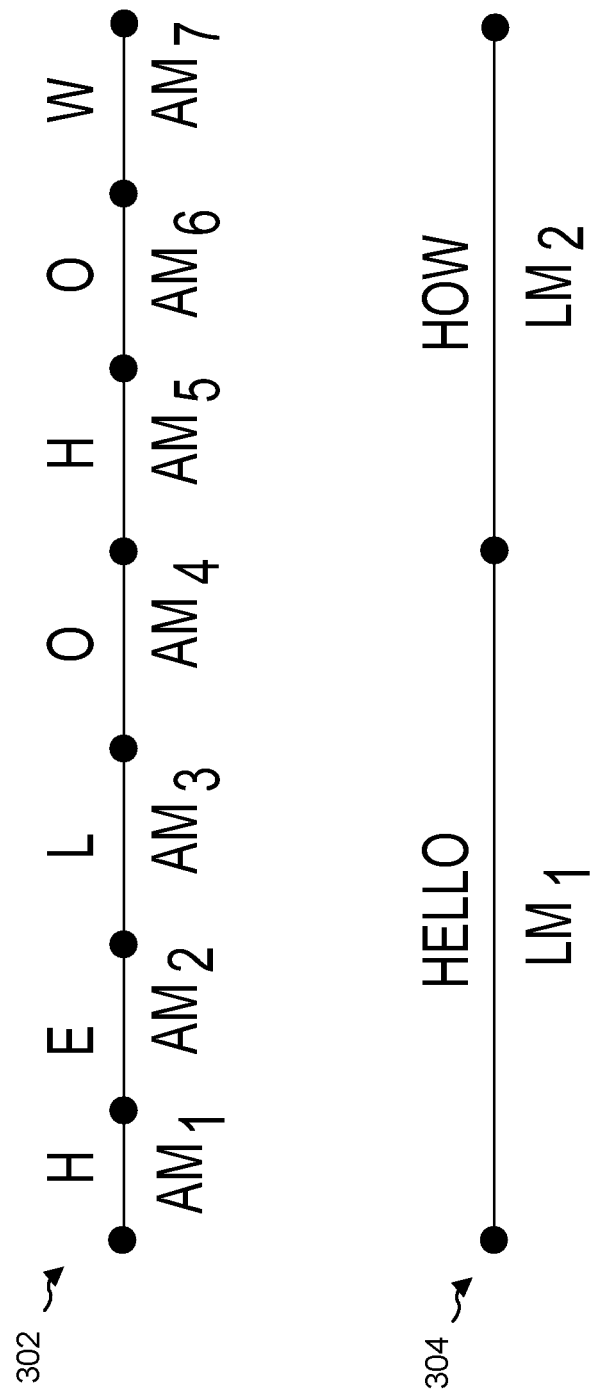
FIG. 3 illustrates phoneme processing and word processing according to one aspect of the present disclosure.

FIG. 3 illustrates the relationship between acoustic modeling and language modeling. As illustrated, each processed phoneme included in the path 302 is associated with an acoustic model score AM1 through AM7. The language model is then applied to associate each word in the path 304 with a language model score LM1 or LM2.

As part of the language modeling (or in other phases of the ASR processing) the speech recognition engine 258 may, to save computational resources, prune and discard low recognition score states or paths that have little likelihood of corresponding to the spoken utterance, either due to low recognition score pursuant to the language model, or for other reasons. Such pruned paths/hypotheses are considered inactive. Active hypotheses are hypotheses that are still under consideration by the speech recognition engine 258. Thus, active hypotheses may have a confidence score that is above a certain threshold as they have thus far avoided pruning. As ASR processing continues, at different points in the ASR processing different hypotheses may be considered "active" as other hypotheses are added and/or removed from active consideration based on incoming audio data and acoustic model processing. Further, during the ASR processing the speech recognition engine 258 may iteratively perform additional processing passes on previously processed utterance portions. Later passes may incorporate results of earlier passes to refine and improve results. Paths which are being currently processed and considered as a potential output of the system are thus considered active hypotheses.

Figure 4:
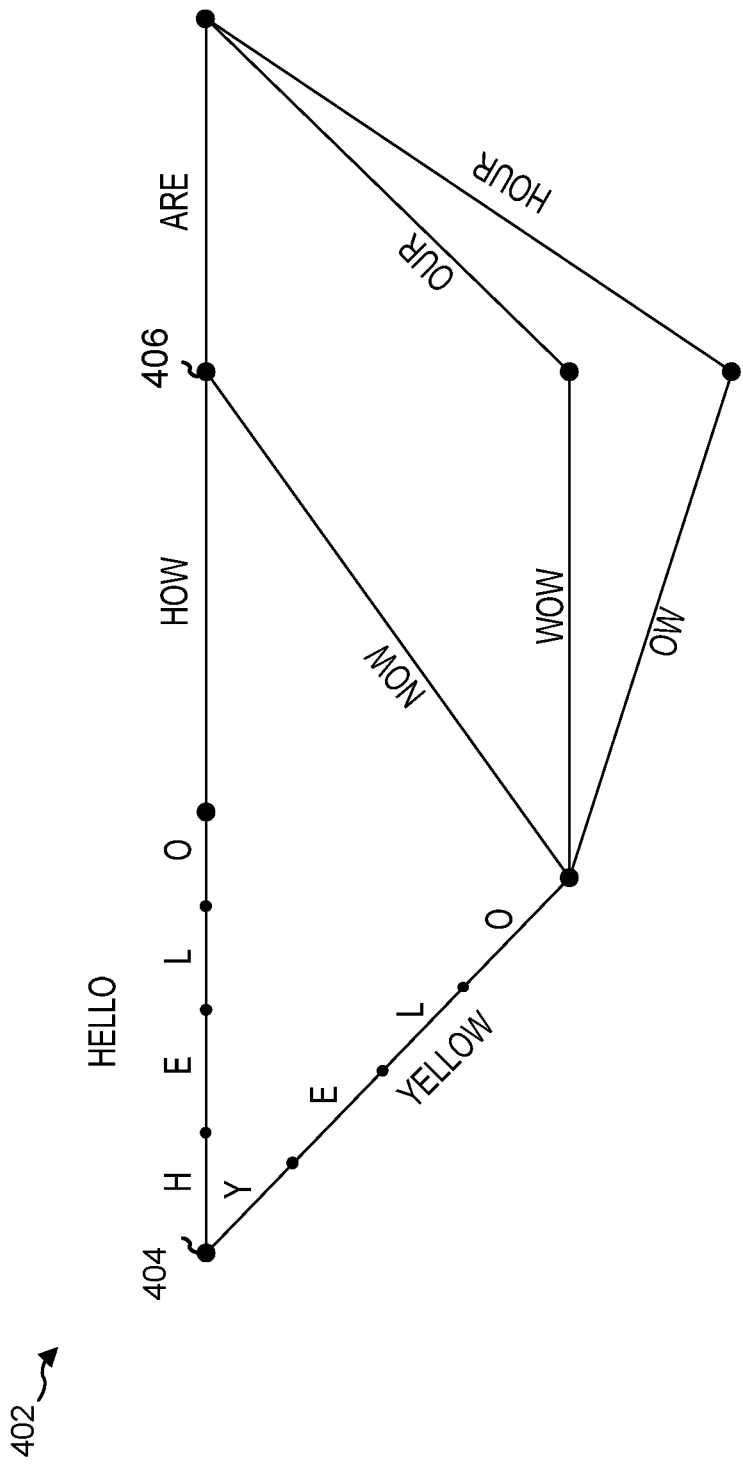
FIG. 4 illustrates a speech recognition lattice according to one aspect of the present disclosure.

The speech recognition engine 258 may combine potential paths into a lattice representing speech recognition results. A sample lattice is shown in FIG. 4. The lattice 402 shows multiple potential paths of speech recognition results. Paths between large nodes represent potential words (for example "hello", "yellow", etc.) and paths between smaller nodes represent potential phonemes (for example "H", "E", "L", "O" and "Y", "E", "L", "O"). For purposes of illustration, individual phonemes are only shown for the first two words of the lattice. The two paths between node 404 and node 406 represent two potential word choices, "hello how" or "yellow now". Each path point between nodes (such as a potential word) is associated with a recognition score. Each path across the lattice may also be assigned a recognition score. The highest recognition score path, where the recognition score is a combination of the acoustic model score, the language model score, and/or other factors, may be returned by the speech recognition engine 258 as the ASR result for the associated feature vectors.

Figure 6:
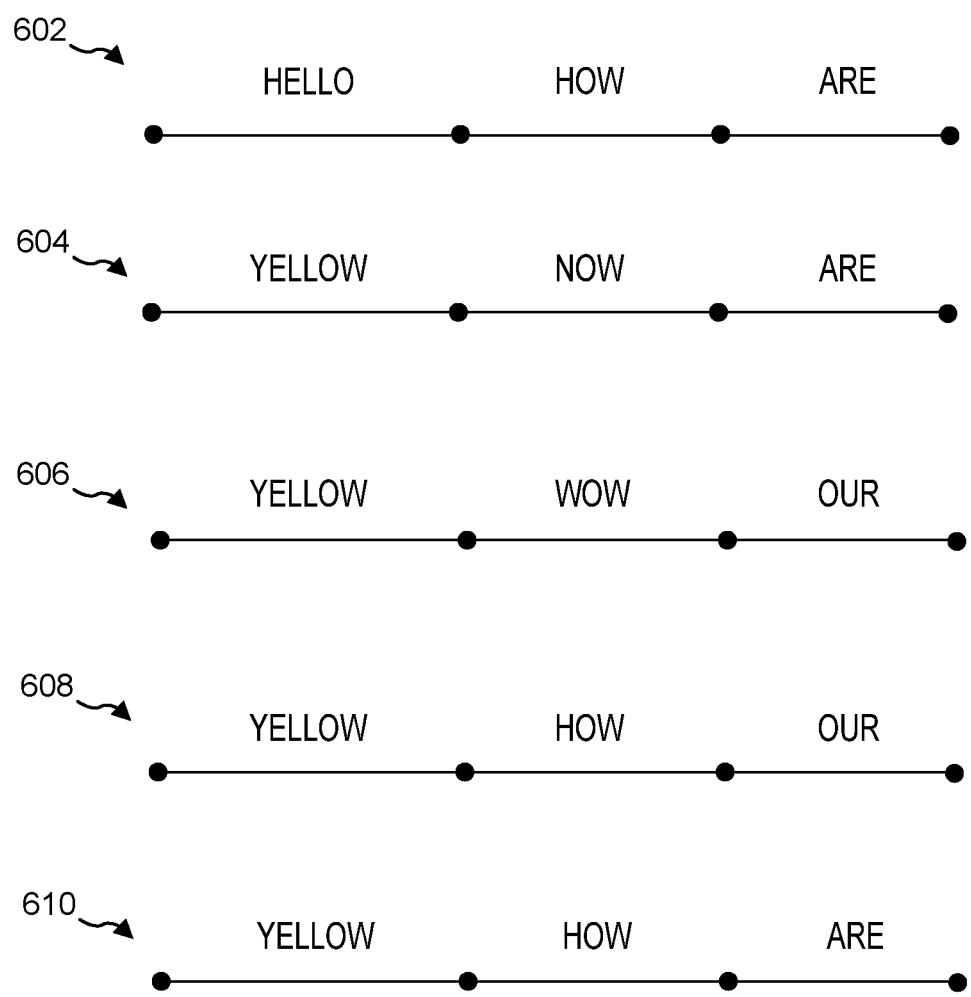
FIG. 6 illustrates a number of hypotheses associated with the lattice of FIG. 4.

Illustrated in FIG. 5 are different potential paths along the lattice 402. As shown in FIG. 5, path 502 results in "hello how are," path 504 results in "yellow now are" and path 506 results in "yellow wow our." As can be seen, many such paths are possible even in the small example lattice 402. An example of such paths 602-610 are shown in FIG. 6. It is not uncommon for a speech recognition process to consider many thousands of different paths, i.e., hypotheses, when performing speech processing. Each hypotheses may be associated with a score, ranking it relative to other hypotheses. The score may be based on the input audio data, the processing from the acoustic model, the training of the language model, etc.

Each hypotheses may include an end state which indicates the end of the utterance of the specific hypotheses. The end state is a state, for example an HMM state, used by the acoustic model and/or language model to indicate a particular hypothesis is complete. As the system traverses the lattice and considers potential hypotheses, the system considers whether the utterance has potentially reached an end state based on the confidence score of the particular hypothesis. Typically, however, a speech processing system performs endpointing similarly regardless of the domain of utterance. In the present system, however, the system may be configured to make a domain determination based on a first portion of an utterance, and may then make a later endpointing determination for a second portion of the utterance based on the domain determined in the first portion of the utterance. This may result in improved endpointing as utterances for one domain may be expected to have different endpointing/pause characteristics of a different domain. For example, "what is the weather" may be a complete utterance by itself, but it also may be followed by additional words, such as "in Seattle," "in January," "tomorrow," etc. where certain pauses may be included between different portions of the utterance. Similarly, "play music" may be a complete utterance by itself, but it also may be followed by additional words, such as "by Sting," "something fun," etc. where again certain pauses may be included between different portions of the utterance. Further, commands from another domain, for example, "send a message to mom" may typically be followed by additional speech with the message contents, but those contents may follow a pause between "mom" and the remainder of the message. The likelihood that the utterance has reached an end state thus may depend on the overall confidence of the particular hypothesis that may have reached an end state. The likelihood that the utterance has reached an end state thus may also depend, for example, on the individual words of the hypothesis and whether the speech continues. The likelihood that the utterance has reached an end state may thus depend on the domain of the utterance. When the system is aware of the domain of the utterance, it will be able to perform improved endpointing and improved overall speech processing.

In an HMM-based ASR system, the end-of sentence probability is modeled by the end states of the language model. For example, to determine an endpoint for a particular hypothesis, if an acoustic model has recognized a certain number of non-speech frames, a corresponding hypothesis may indicate an end state, assuming that the prior words of the hypothesis indicate a complete utterance.

An endpoint detector that uses the speech recognition engine 258 can take advantage of hypothesis information. As described in detail below, as the system progresses through a lattice, the likelihood that an endpoint has been reached may be determined by considering the overall pause duration and the active hypotheses that are under consideration by the ASR engine. As different hypotheses may correspond to different experienced pause durations (for example, as a result of specific hypotheses differing as to whether certain frames include speech or do not include speech) it may be desirable to consider pause duration across a plurality of active hypotheses.

The ASR module 250 may track a number of received audio frames that do not include speech, or do not include sufficient audio features to be considered speech. Such frames may be considered non-speech, or pause frames. A non-speech or pause frame may be determined by comparing the data from one or more feature vector(s) associated with the frame with one or more thresholds, to determine if the feature vector(s) represent audio likely to correspond to speech to be processed or likely to correspond to other audio such as noise, silence, background talking (i.e. speech not to be processed), etc. Thus a non-speech/pause frame is one in which the audio data of the respective frame is determined not to correspond to an utterance for ASR processing. Machine learning techniques may be used (such as those described herein) to train a model to determine when incoming audio data matches a non-speech/pause frame. Tracking of non-speech frames may be incorporated into processing by an acoustic model and/or language model, for example by adding node(s)/path(s) at the end of an active hypothesis where such node(s)/path(s) represent a certain duration of non-speech, for example one or more non-speech/pause frames. Such node(s)/path(s) may be considered non-speech node(s)/path(s), or pause node(s)/path(s). Such pause node(s)/path(s) may indicate a certain duration of audio that included a pause or non-speech. Such node(s)/path(s) may be differentiated from other node(s) /paths(s) which may also include other non-speech, such as semantic tags, state indicators, or other non-speech items.

Alternatively, or additionally, the ASR module 250 may run one or more counters, for example, one for each hypothesis, that counts a number of immediately preceding non-speech frames predicted by that hypothesis. The system may refer to such counters during processing to determine how much non-speech is associated with a particular hypothesis. The system may also refer to such counters when encountering a pause node(s)/path(s), particularly if the pause node(s)/path(s) does not track the duration of an ongoing pause. The counter will indicate to the system how long a pause has been ongoing. Upon predicting a frame that does include speech for processing, the counter for that particular hypothesis may be reset. Further, a phoneme path/node may be added to the hypothesis, such that the end of the hypothesis may no longer be a path and/or node associated with non-speech. As an example, if a first hypothesis predicts a non-speech frame, a counter associated with the first hypothesis may be set to one and/or a path/node may be added to the end of the first hypothesis indicating non-speech. If the first hypothesis predicts five more non-speech frames, the counter may be incremented each time until it ultimately reaches a value of six. Further, non-speech paths/non-speech nodes (i.e., paths or nodes indicting non-speech) may be added to the end of the first hypothesis indicating five more frames of non-speech. If the first hypothesis then predicts a frame including speech, the counter may be reset to zero and a phoneme path/node may be added to the end of the first hypothesis. Thus, at any particular point in speech processing, the system may either look at a particular counter to determine an amount of non-speech predicted by a hypothesis immediately prior to the particular point. The system may also count a number of non-speech paths/nodes immediately prior to the particular point in order to determine an amount of non-speech predicted by a hypothesis.

Pause duration for a single hypothesis relative to a current point in ASR processing may also be calculated as the number of consecutive frames for which a hypothesis has been in a non-speech state immediately preceding the current point, or zero if the hypothesis is currently in a speech state. Other methods for determining/estimating non-speech predicted/seen for a particular hypothesis are also possible. Further, other metrics for duration of non-speech (beyond, for example, frames) may also be used.

The system may determine an endpoint based on non-speech as predicted by a hypothesis. For example, the system may determine that a single hypothesis (for example, a top scoring hypothesis) shows non-speech (for example, a certain amount of non-speech beyond a threshold) and therefore the system may declare an endpoint. However, it may also be desirable to make the endpointing decision based on the non-speech predicted by many different hypotheses, thereby smoothing any potential effects of outlier hypotheses. Thus, instead of basing an endpointing decision on a single pause duration of a single hypothesis, the system may determine an expected pause duration, which is an estimated pause duration as calculated by looking at multiple hypotheses and potentially weighting each respective pause duration based on the confidence associated with the respective hypothesis of each respective pause duration. To obtain an expected pause duration for an utterance across multiple hypotheses, the system may thus consider the probability or score of each individual hypothesis and weight the pause duration of each hypothesis using the hypothesis' respective probability. The system may then group all the weighted pause durations to determine an overall pause duration for the audio data under consideration. This overall pause duration may be referred to as the expected pause duration. Thus, by assigning a probability to a hypothesis and computing the weighted average of pause durations over active hypotheses, the system may derive the expected pause duration. The system may further define the expected pause duration at utterance end by calculating the expected pause duration only over hypotheses that are currently in a language model end state. As explained below, when the overall expected pause duration and/or expected pause duration for hypotheses at an end state are beyond certain threshold(s), the system may determine an endpoint, thus allowing the system to complete speech processing and return a recognition result for the entire utterance. Determination of the expected pause duration, the expected pause duration for hypotheses at an end state, and other endpointing may be performed, for example by an endpointing module 1190 in communication with an ASR module 250.

As explained above, each audio frame, the ASR search space is expanded based on the given decoding graph/lattice, which includes both an acoustic model (AM) score and a language model (LM) score. The acoustic and language scores are accumulated along the decoding path for individual hypotheses. For present purposes, let $X_t = \{x_1, x_2, x_3 \ldots, x_t\}$ be the sequence of audio frames until time (or audio frame) t and let $S_t^i = \{s_1^i, s_2^i, s_3^i, \ldots, s_t^i\}$, i=[1, Nt] be the state sequence of the ith active hypothesis at time t. For any given time t, $N_t$ is the number of active hypotheses. The posterior of the hypothesis can be presented as:

$$P(S_t^i \mid X_t) = \frac{P(s_t^i \mid x_t)}{P(s_t^i)} P(s_t^i \mid s_{t-1}^i) P(S_{t-1}^i \mid X_{t-1}) \quad \text{(Equation 1)}$$

where $P(s_t^i|x_t)/P(s_t^i)$ is the acoustic score using the posterior generated by the ASR module and normalized by the state prior. $P(s_t^i|s_{t-1}^i)$ is the multiplication of language model probabilities and HMM transition probabilities. $L_t^i$ denotes the pause duration for the i-th hypothesis. $L_t^i$ may be measured in frames or in time units (ms, etc.) $L_t^i$ may also be defined as the largest integer N such that $s_{t-N+1}^i \in S_{NS} \wedge \ldots \wedge s_t^i \in S_{NS}$ holds, where SNS denotes the set of all non-speech states. Thus, if at time t−N, hypothesis i saw speech, then began seeing non-speech at time t−N+1. Thus, at time t (which is the time at which a determination is made), hypothesis i has been seeing non speech for N time units. The pause duration $L_t^i$ for a given hypothesis i can be derived from a traceback through the decoding graph kept by the decoder. The input label of each arc in the decoding graph can be mapped to an HMM state representing a context dependent phone, and hence can be further mapped to the speech or non-speech case. A non-speech frame represents a pause and such frames may be cumulatively added to arrive at the pause duration $L_t^i$ for a particular hypothesis i at a particular time t. As noted above, one the hypothesis encounters a speech frame, L for that hypothesis may be reset to zero.

In one embodiment, the system may determine the experienced pause duration, $L_t^i$ for the top scoring language model (LM) hypothesis i=Top scoring LM hypothesis, thus calculating $L_t^{TOP}$. The system may declare an endpoint If $L_t^{TOP}$ exceeds a certain threshold, called $T_{end}$ and the top scoring LM hypothesis is in an end state ($S^{TOP} \in S_{nd}$ or $s_t^{TOP} = S_{end}$). Thus, for making the endpoint decision the endpointing module 1190 may consider only hypotheses being in a language model end state, and among these hypotheses the endpointing module may select the best scoring one. The endpointing module 1190 determines an endpoint has been reached if the selected hypothesis is the overall best hypothesis as indicated in Equation 2 below and if the pause duration of the overall best hypothesis exceeds a threshold, as indicated in Equation 3 below.

$$\operatorname*{argmax}_{i, s_t^i \in S_{end}} P(S_t^i \mid X_{t=i}) = \operatorname*{argmax}_i P(S_t^i \mid X_t), \qquad \text{(Equation 2)}$$

$$L_t^i > T_{end} \text{ with } i := \operatorname*{argmax}_{i, s_t^i \in S_{end}} P(S_t^i \mid X_t), \qquad \text{(Equation 3)}$$

The pause duration threshold $T_{end}$ may be tunable and thus configured to a value determined to achieve a certain desired system performance with regard to endpoint detection. The threshold may also be specific for a particular domain. Meaning a first threshold may be determined to be a desired threshold for a first domain whereas a second threshold may be determined to be a desired threshold for a second domain. As the system processes an incoming utterance, it may determine the domain of the utterance and activate the threshold for endpointing purposes. The same process may apply for various other thresholds discussed below. Further, a threshold may be selected based on how long an utterance has continued (i.e., how many speech frames have been encountered in incoming audio data). Thus, certain endpointing thresholds may apply for short utterances whereas other endpointing thresholds may apply for long utterances. Further, each domain may have different thresholds for long or short utterances. Thus, a system may perform ASR processing on an incoming utterance to determine the utterance corresponds to a first domain. The system may then activate a first endponting threshold associated with the first domain and with utterances under a first length. As processing of the utterance continues, if the utterance passes the first length the system may then activate a second endpointing threshold associated with the first domain and with utterances over a first length.

Under certain conditions, an edge case may appear when the language model fails to correctly predict the end of the sentence. In that case the probability of the best non-sentence end hypothesis continuous to prevail and the endpoint detector doesn't trigger. This case can be solved by alternatively triggering detection of an endpoint if the pause duration of the overall top scoring (i.e., best) hypothesis exceeds a threshold, regardless of whether the top scoring hypothesis is in an end state. This alternative end state detection is described below in Equation 4.

$$L_t^i > T \text{ with } i := \operatorname*{argmax}_i P(S_t^i \mid X_t), \qquad \text{(Equation 4)}$$

where T is chosen such that T>Tend. The endpointing of Equations 2 and 3 may be used in conjunction with the endpointing of Equation 4, so that Equation 4 serves as a fallback to Equations 2 and 3, thus preventing a situation where the system never declares an endpoint when the language model never reaches an end state.

This described method of determining endpointing based on the top scoring hypothesis of a language model provides an effective approach to endpoint detection while considering the operation of the language model on the input utterance.

One difficulty with this approach, however, is that the above approach is dependent on what hypothesis is considered the top scoring hypothesis, and that the top scoring hypothesis may change rapidly between processed frames. For example, in an HMI based ASR decoder the language model may correct a particular hypothesis throughout operation of the speech processing engine 258. Further, optimization of the speech processing engine 258 may result in the language model score distribution along a particular path of the lattice taking the form of a non-smooth step function. Other factors such as noise, etc. may contribute to rapid switching between "top" hypotheses. To account for fluctuations between different hypotheses being the top scoring hypothesis, and corresponding complications to the endpointing system, the system may consider a plurality of active hypotheses to arrive at an expected pause based endpoint detection, as described below. Although the expected pause based endpoint detection below is described as using all active hypotheses, a subset of active hypotheses may also be considered, for example, active hypotheses above a certain score threshold, only a certain number of active hypotheses, etc. These variations are not expressly discussed below, but should be considered as part of the described method as an alternative to considering all active hypotheses as illustrated below.

As noted above, a speech recognition engine 258 may consider many active hypotheses when determining ASR output. For example, several thousand hypotheses may be active at any particular point during the ASR processing. Each particular hypothesis is associated with a score/probability P. Each particular hypothesis i also has some length of silence or non-speech $L_t^i$ detected at any particular point in time t, where L is a running tally of how much uninterrupted non-speech preceded time t for the particular hypothesis i. For example, L may be 5 frames of uninterrupted non-speech prior to time t, in which case L may be a value of 5 (or may be a value of 125 ms if 25 ms frames are used). In another example, L may be 0 if the most recent frame for a particular utterance was a frame that included speech. The system may consider the value of L for each active hypothesis, weighted by each hypothesis' respective probability, to arrive at an overall picture of the pause at a particular moment in time, the expected pause duration. Thus, the expected pause duration D at time t may be represented by a sum of pause durations $L_t^i$ across hypotheses i where each duration is multiplied by the normalized probability (i.e., posterior probability) $P(S_t^i | X_t)$ at time t for each hypotheses i at that particular state $S_t^i$ and audio frame $X_t$. The expected pause duration function is shown below in Equation 5.

$$\mathbb{D}(L_t) := \sum_i L_t^i P(S_t^i \mid X_t), \qquad \text{(Equation 5)}$$

which can be interpreted as an expectation of the pause duration computed over all active decoding hypotheses. Smoothing the pause duration by considering the active hypotheses makes the value less sensitive to changes in the best decoding hypothesis. Thus the summed weighted pause durations of Equation 5 may provide a more robust determiner for pause duration of the input audio at time t. Because the cumulative probabilities of all hypotheses is typically below a known number (for example 1, 1000, or some other number depending on system configuration), and the individual probability of any particular hypothesis is under that known number, the expected pause duration D of Equation 5 may be considered a weighted average expected pause duration across active hypotheses.

While D of equation 5 illustrates the expected pause duration for active hypotheses under consideration, the system may also consider the expected pause duration at utterance end, that is calculating the expected pause duration but only for active hypotheses which have reached an end state in the language model. This expected duration, $D_{end}$ is illustrated in Equation 6.

$$\mathbb{D}_{end}(L_t) := \sum_{i, x_t^i \in S_{end}} L_t^i P(S_t^i | X_t),$$ (Equation 6)

The expected pause duration at utterance end $D_{end}$ of Equation 6 may be considered a weighted average expected pause duration across active hypotheses at an end state. As may be appreciated, $D \geq D_{end}$ as D includes active hypotheses but $D_{end}$ only includes active hypotheses are in an end state. For pauses in the middle of an utterance, the value of $D_{end}$ will remain small. But as the length of a pause in input audio increases, more active hypotheses under consideration will reach an end state, and the value of $D_{end}$ will converge to the value of D, thus reaching $D = D_{end}$ when all active hypotheses are in an end state.

Using the above equations, the endpointing module 1190 may determine an endpoint if either of two situations occurs:
1. $\mathbb{D}_{end}(L_t) > T_{end}$ and $\mathbb{D}(L_t) > T'$, or
2. $\mathbb{D}(L_t) > T'$ The first condition of situation 1 is that the expected pause duration at utterance end, $D_{end}$, has reached a certain threshold $T_{end}$. Thus, if the expected pause duration experienced by the number of active hypotheses at an end state crosses threshold $T_{end}$, then the first condition of situation 1 is met. The second condition of situation 1 is that the expected pause duration of active hypotheses (regardless of hypothesis state) has reached a certain threshold T'. Thus, if the expected pause duration experienced by all active hypotheses crosses threshold T', then the second condition of situation 1 is met. This second condition serves as a check on the first condition to avoid a mid-utterance pause accidentally resulting in an endpoint being triggered. For example, if the beginning of an utterance is "what is the weather [pause]", depending on the pause length a number of hypotheses may not yet have reached an end state. The second condition safeguards against prematurely declaring an endpoint in response to a mid-utterance pause, which may result when a language model fails to correctly predict the end of an utterance. If both the first condition and second condition of situation 1 are met, then an endpoint may be declared. Alternatively, the system may declare an endpoint if only the first condition of situation 1 is met or if the second condition of situation 1 is met, but it may be preferable to declare an endpoint when both conditions of situation 1 are met.

Condition 2 acts as an endpointing safety valve, similar to that discussed above with reference to endpointing based on the best hypothesis. If the speech recognition engine 258 encounters errors, the system does not want to experience a loop where endpointing never occurs. Thus, a safety threshold T may be configured so that if all active hypotheses crosses threshold T, an endpoint is declared. While the values of T, T', and $T_{end}$ are configurable to arrive at a desired system performance, it can be appreciated that T is larger than and T' and $T_{end}$ in order for T to serve as the safety threshold. The various threshold values may be optimized over a development training data set using machine learning techniques discussed above. Further, while the above techniques may be used with existing language models, during training of language models, language models may be optimized to carefully select end states within hypotheses. For example, a training set of utterances with known end points may be used and the language model may be trained to minimize a cost function of missing the end point. Other such training configurations are also possible.

Figure 7:
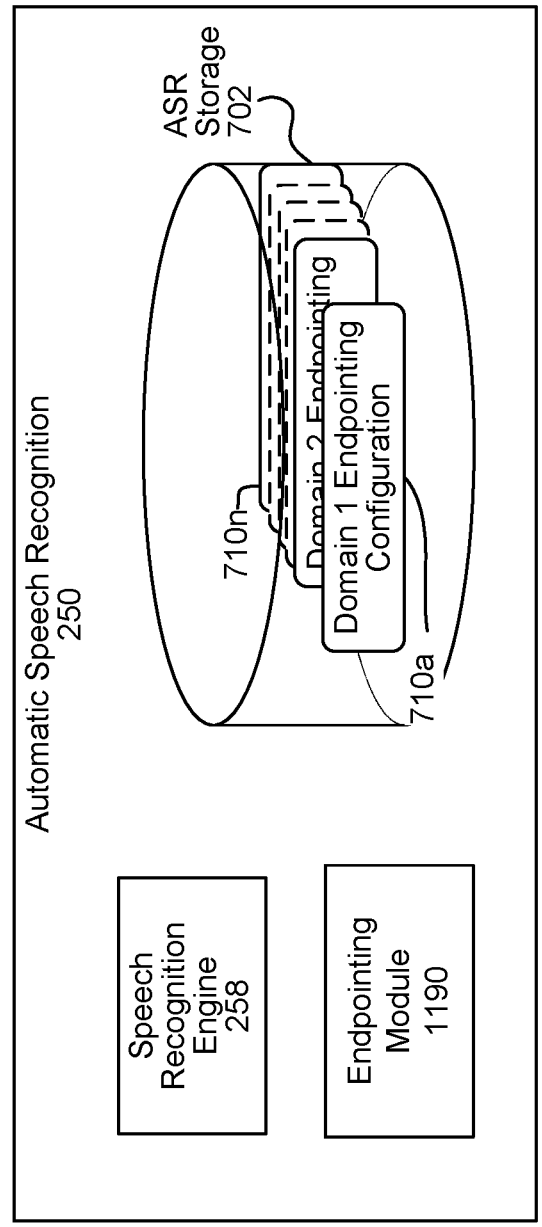
FIG. 7 illustrates domain-specific endpointing data that may be used by a speech recognition system.

The thresholds discussed above may be different for different domains that an utterance corresponds to. Thus, the system may determine a domain corresponding to an utterance being processed and may access domain specific endpointing configuration(s) that may be used by an endpointing module 1190 during processing. The domain specific thresholds are examples of such domain specific endpointing configurations. Such configurations (710a-710n) may be stored, for example, in some ASR storage 702 which may be incorporated into an ASR module 250, as illustrated in FIG. 7, or may be located elsewhere. During processing the speech recognition engine 258 (or other component) may determine the domain corresponding to a command and may identify the domain to the endpointing module 1190, which in turn may identify the desired domain-specific configuration 710 to be used from the ASR storage 702. Alternatively, a different component may identify the desired domain-specific configuration 710 for use by the endpointing module 1190. The domain-specific configuration 710 may be one or more thresholds of non-speech frames to use during endpointing as discussed above.

Figure 8A:
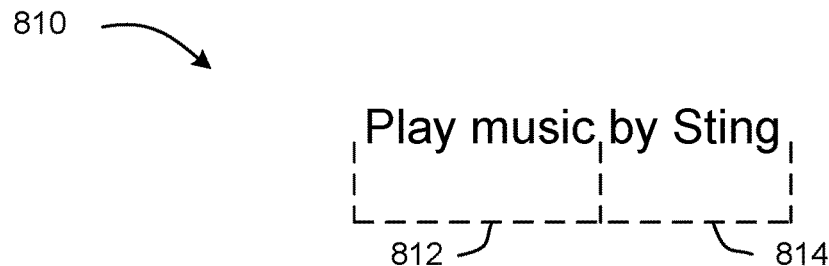
FIGS. 8A-8C illustrate processing of audio by a speech recognition system.

To determine the domain of a command, the speech recognition engine 258 may process a portion of an incoming command to estimate the domain of the audio data corresponding to the command. That is, the speech recognition engine 258 may process the text of one or more active hypotheses to determine if the text corresponds to a particular domain. For example, incoming audio data may have a first portion and a second portion. The speech recognition engine 258 may perform ASR on the first portion to identify first text and may determine a domain using the first text. For example, as shown in FIG. 8A, audio data 810 may be received by the system and may undergo ASR processing. The speech recognition engine 258 may determine first text 812 corresponding to the first portion of the audio data and may determine that the first text "play music" corresponds to a music domain. The system may then identify a music domain specific configuration 710 which the endpointing module 1190 may use to determine the end of the second portion of the audio data as part of the ASR processing. Also as part of the ASR processing the system may determine second text 814 "by Sting" corresponding to the second portion of the audio data. The system may then send the first text and/or second text to cause execution of a command corresponding to the audio data (for example, instructing downstream music playing component to play music by Sting).

Figure 8B:
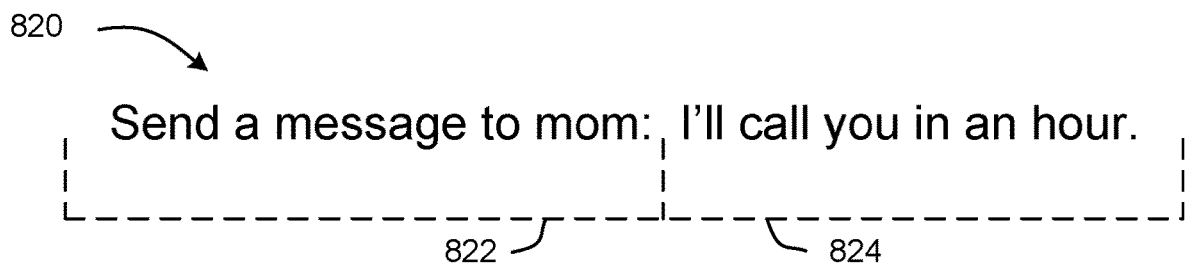

As noted above, certain domains may involve different speech patterns by different users, thus resulting in potentially different pauses in audio data corresponding to the utterance. Thus, in another example (which may be at a different time from the example discussed in reference to FIG. 8A), the system may receive further audio data 820 as shown in FIG. 8B. The speech recognition engine 258 may determine first text 822 corresponding to the first portion of the audio data and may determine that the first text "send a message to mom" corresponds to a messaging domain. (Potentially the system may determine the domain even earlier, such as with the text "send a message" or even just "send.") In a certain configuration the system may determine a probability that the audio data corresponds to an utterance and may adjust that probability up or down as further audio data is processed. Further, the system may determine a respective probabilities for multiple domains simultaneously, with the system using the domain specific configuration 710 for the highest scoring domain at any particular point in time. With a highest probability domain determined (e.g., messaging), the system may identify a messaging domain specific configuration 710 which the endpointing module 1190 may use to determine the end of the second portion of the audio data as part of the ASR processing. Also as part of the ASR processing the system may determine second text 824 "I'll call you in an hour" corresponding to the second portion of the audio data. The system may then send the first text and/or second text to cause execution of a command corresponding to the audio data (for example, creating a message with the text "I'll call you in an hour" and sending that message to a destination associated with a recipient "mom").

Figure 8C:
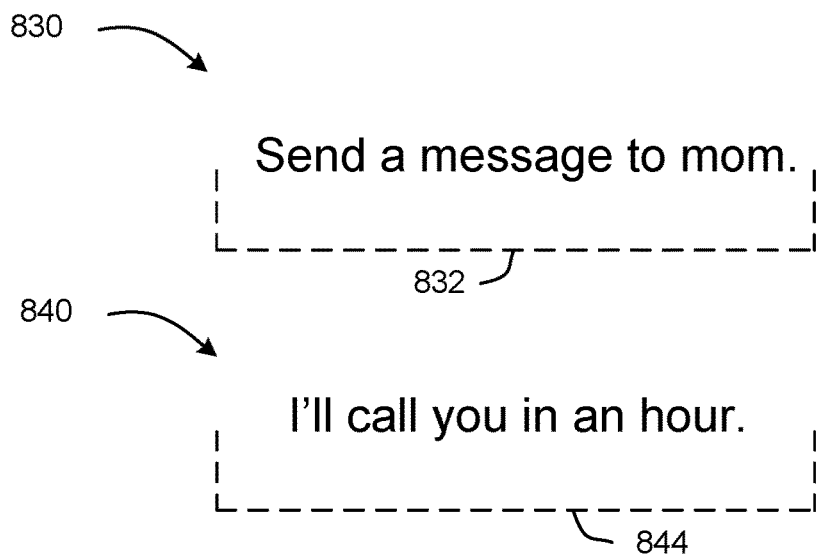

As illustrated in FIGS. 8A and 8B, the first portion of the audio data may identify the desired domain/command (music, messaging, etc.) whereas the second portion of the audio data may identify what should be executed/i.e., the subject of the command. Thus, the first portion may be referred to as the carrier and the second potion may be referred to as the payload. In certain circumstances, however, the carrier and the payload may arrive as a result of different distinct utterances or exchanges with the system. For example, as illustrated in FIG. 8C, a first utterance may correspond to first audio data 830 received by the system. The system may process that first audio data to determine first text 832 and may determine a domain based on the first text which the system has determined is the carrier portion. The system may then prompt the user to provide second audio corresponding to a second utterance that includes the payload corresponding to the carrier. The system may then process second audio data corresponding to the second utterance using the domain specific endpointing configuration 710 of the domain determined in the carrier utterance to determine the end of the second utterance and determine second text 844 corresponding to the second utterance. Thus, the system may identify a domain corresponding to a first utterance and apply domain specific endpointing to a second utterance that relates to the first utterance. In this example, the first utterance and second utterance may be considered part of a single command (that may actually involve even more than two utterances depending on the command and system configuration).

Figure 9:
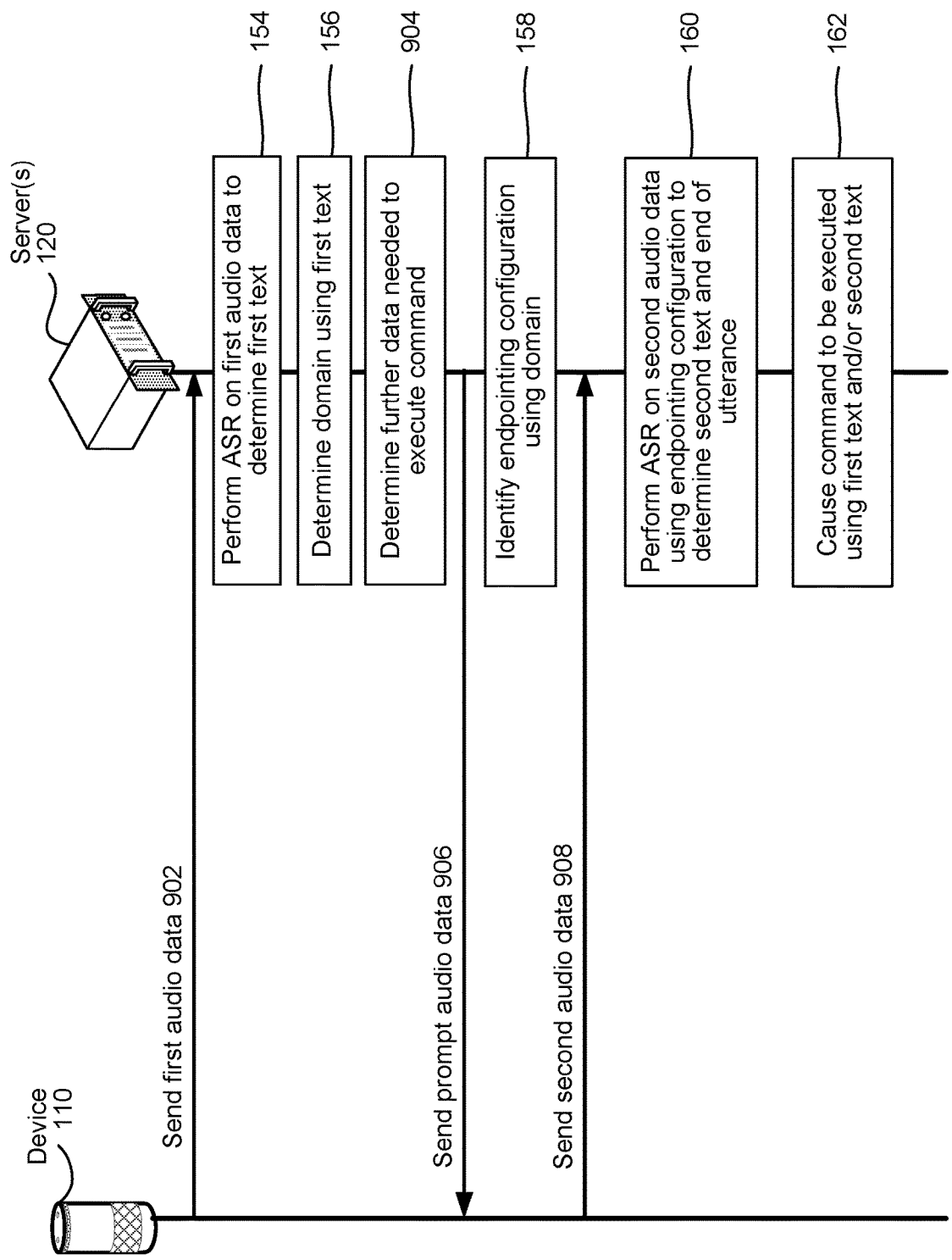
FIG. 9 illustrates operations performed by a speech recognition system.

An example of the system processing two utterances as part of a single command is shown in FIG. 9. As shown, a device 110 sends first audio data 902 to the server 120. The server 120 receives the first audio data and performs (154) ASR on the first audio data to determine first text. The system may then determine (156) a domain corresponding to the utterance using the first text. The system may determine (904) that further data is needed to execute the command. For example, the system may determine that the first text corresponds to a carrier portion of a command but that a payload portion is still expected in order to execute the command. The system may then prompt the user for the payload portion by sending (906) prompt audio data to the device 110, which the device 110 may then playback to prompt the user to provide payload information. (Alternatively, the prompt may be unnecessary and the system may simply wait for further audio data corresponding to the payload.) In anticipation, the system may also identify (158) endpointing configuration information using the domain.

The device 110 may then send (908) second audio data to the server 120. The server may then perform (160) ASR on the second audio data using the identified domain-specific endpointing configuration to determine the end of the utterance of the second audio data. During ASR the system also determines second text corresponding to the second audio data (which may correspond to the payload). The system may then cause a command to be executed (162) using some combination of the first text and second text. As can be appreciated, a similar process may occur for a single utterance where the first audio data and second audio data correspond to different portions of audio data corresponding to the same utterance.

The domain-specific endpointing configuration may correspond to a threshold pause length during a particular utterance after which an endpoint is declared. The pause length may correspond, for example, to a number of consecutive non-speech frames immediately preceding an endpoint or a number of consecutive non-speech nodes immediately prior to an endpoint. Other examples of domain-specific endpointing configurations may also (or alternatively) be used.

It may be desirable for the system to differentiate between messages that include a payload (which may be of different lengths) and messages that do not include the payload. For example, the system may desire for an endpointing module 1190 to operate aggressively (i.e., be more likely to declare an endpoint with a small number of non-speech frames) for a carrier-only utterance than for an utterance that includes both a carrier and a payload. Further, the system may desire for the endpointing module 1190 to operate more aggressively for a short payload (where the user is unlikely to pause during an utterance) and operate less aggressively for a long payload (where the user is more likely to pause or utter non-speech such as "um," "uh," or the like). Thus the system may have various endpointing settings that enable the endpointing module 1190 to operate at varying degrees of aggressiveness, such as high aggressiveness for utterances with no payload, medium aggressiveness for utterances with a short payload or low aggressiveness for utterances with a long payload (or other configurations). Thus, the system may further determine an endpointing configuration (or the endpoint itself) based on a length of an utterance (or hypothesis) being processed. By determining the domain based on the text and length of incoming audio the system may dynamically determine (and adjust) an expected domain and may operate using the endpointing configuration for the specific domain and potential payload length.

While the system may use a set of rules and pre-configured thresholds or other endpointing configurations, the system may also make use of a trained machine learning model to determine a domain-dependent endpoint of an incoming utterance. For example, the system may use a trained dynamic neural network (DNN), trained classifier, or other model to process features passed to the endpointing module 1190 by the speech recognition engine 258. The features may include, for example, an estimate of the utterance's domain, a confidence of the estimate, the number of words (or phonemes) that have been processed so far, some other indication of utterance length, the number of consecutive non-speech frames/nodes that have processed up to the current point, or the like. The DNN/trained model may then operate to determine a confidence level that an endpoint has been reached where the confidence depends on the domain of the utterance. When the DNN/trained model reaches a certain confidence, the endpoint may be determined and ASR processing concluded.

Another endpointing mechanism may use multiple machine learning techniques described above. For example, a classifier (such as an SVM) or other model may be trained to determine an endpoint based on the domain, the pause of the best hypothesis and the expected pause duration across multiple active hypotheses (including, potentially, active hypotheses at an end state). The classifier may be trained using a number of support vectors with a number of different training utterances/endpoints representing audio data, pause durations, etc.

Figure 10:
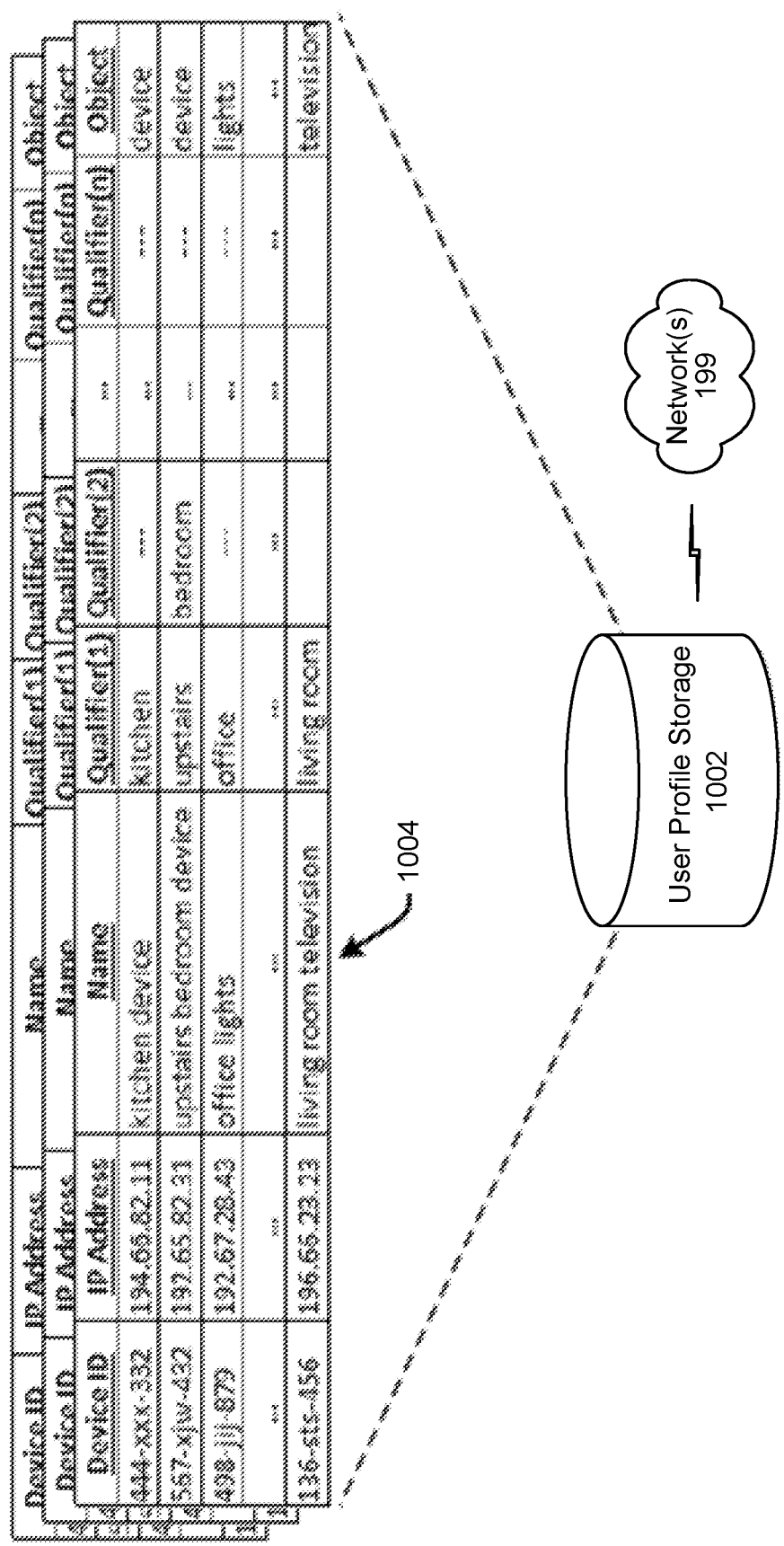
FIG. 10 illustrates data stored and associated with user profiles according to embodiments of the present disclosure.

The server 120 may include or reference data regarding user accounts, shown by the user profile storage 1002 illustrated in FIG. 10. The user profile storage may be located proximate to server 120, or may otherwise be in communication with various components, for example over network 165. The user profile storage 1002 may include a variety of information related to individual users, households, accounts, etc. that interact with the system 100. For illustration, as shown in FIG. 10, the user profile storage 1002 may include data regarding the devices associated with particular individual user accounts 1004. In an example, the user profile storage 1002 is a cloud-based storage. Such data may include device identifier (ID) and internet protocol (IP) address information for different devices as well as names by which the devices may be referred to by a user. Further qualifiers describing the devices may also be listed along with a description of the type of object of the device. For example, user preferences regarding commands can be stored by the server 120. Such user preferences can be used by the server 120 to answer queries as described herein. Further, the user account 1004 may include information regarding the speech pattern of a particular user, which may be used to configure the endpointing module 1190. Thus, the user identify may also be used as a feature (in addition to the domain) that the endpointing module 1190 may consider when determining an endpoint.

Figure 11:
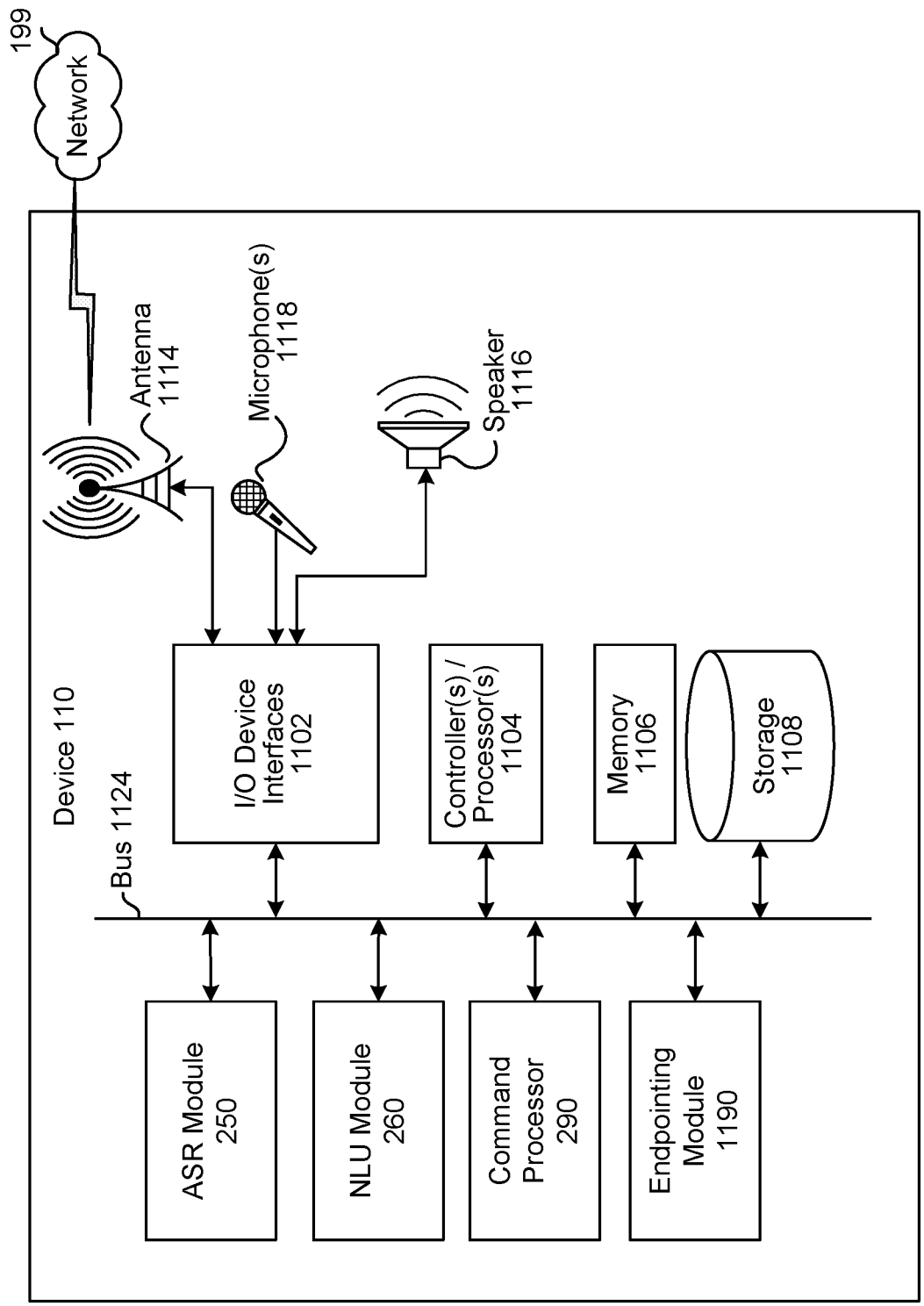
FIG. 11 is a block diagram conceptually illustrating example components of a device according to embodiments of the present disclosure.
Figure 12:
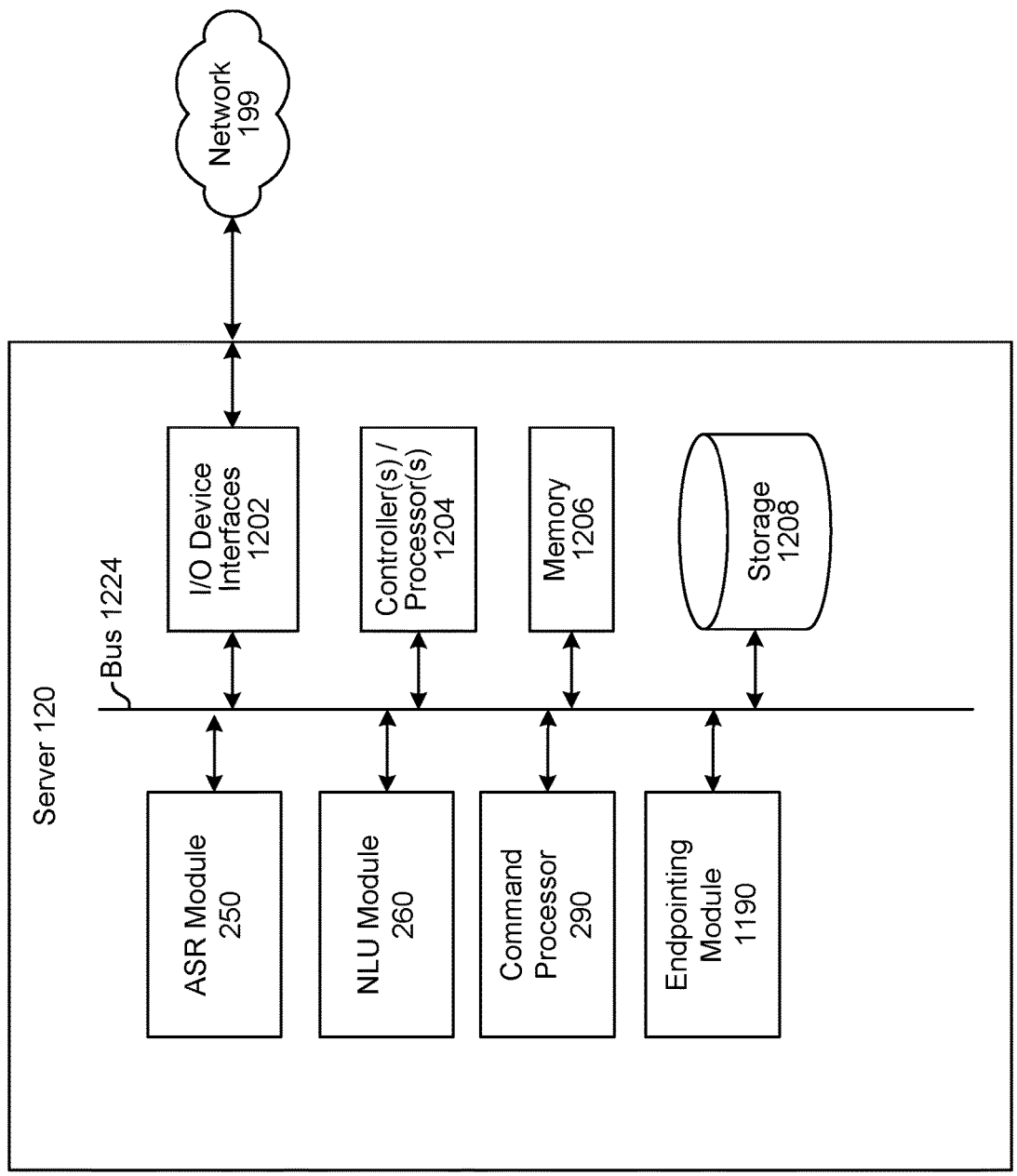
FIG. 12 is a block diagram conceptually illustrating example components of a server according to embodiments of the present disclosure.

FIG. 11 is a block diagram conceptually illustrating a local device 110 that may incorporate certain speech receiving/processing capabilities. FIG. 12 is a block diagram conceptually illustrating example components of a remote device, such as a remote server 120 that may assist with ASR and/or NLU processing. Multiple such remote devices may be included in the system, such as one remote device for ASR, one remote device for NLU, etc. In operation, each of these devices may include computer-readable and computer-executable instructions that reside on the respective device (110/120), as will be discussed further below.

Each of these devices (110/120) may include one or more controllers/processors (1104/1204), that may each include a central processing unit (CPU) for processing data and computer-readable instructions, and a memory (1106/1206) for storing data and instructions of the respective device. The memories (1106/1206) may individually include volatile random access memory (RAM), non-volatile read only memory (ROM), non-volatile magnetoresistive (MRAM) and/or other types of memory. Each device may also include a data storage component (1108/1208), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (1102/1202).

Computer instructions for operating each device (110/120) and its various components may be executed by the respective device's controller(s)/processor(s) (1104/1204), using the memory (1106/1206) as temporary "working" storage at runtime. A device's computer instructions may be stored in a non-transitory manner in non-volatile memory (1106/1206), storage (1108/1208), or an external device(s). Alternatively, some or all of the executable instructions may be embedded in hardware or firmware on the respective device in addition to or instead of software.

Each device (110/120) includes input/output device interfaces (1102/1202). A variety of components may be connected through the input/output device interfaces, as will be discussed further below. Additionally, each device (110/120) may include an address/data bus (1124/1224) for conveying data among components of the respective device. Each component within a device (110/120) may also be directly connected to other components in addition to (or instead of) being connected to other components across the bus (1124/1224).

Referring to the speech-controlled appliance 110 in FIG. 11, the input/output device interfaces 1102 connect to a variety of components such as a microphone 1118 or microphone array, a speaker or speaker(s) 1116, an one or more antennas 1114 supporting wireless communication. Via the antenna(s), the input/output device interfaces 1102 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

The device may include an ASR module 250. The storage 1108 may include ASR models 252 used by the ASR module 250. The ASR module 250 may be configured to identify a limited number of words, such as wake words of the device, or may be configured to perform extended speech recognition to recognize a much larger range of words. The device may also include a limited or extended NLU module 260 that may include certain NLU functions or may include expanded NLU functionality, such as described above in reference to NLU module 260. Storage 1108 may also include an NLU knowledge base 272 and/or entity library 282. The device may also include an endpointing module 1190 to perform endpointing using language model hypotheses as described above. The device may also include a command processor 290 for further execution of spoken commands.

As illustrated in FIG. 12, one or more servers 120 may include the ASR module 250, the NLU module 260, endpointing module 1190 and/or a command processor 290. The command processor 290 may be configured to execute commands associate with an utterance.

As noted above, multiple devices may be employed in a single speech processing system. In such a multi-device system, each of the devices may include different components for performing different aspects of the speech processing. The multiple devices may include overlapping components. The components of the devices 110 and server 120, as illustrated in FIGS. 11 and 12, are exemplary, and may be located a stand-alone device or may be included, in whole or in part, as a component of a larger device or system.

As illustrated in FIG. 13, multiple devices (110a-110d and 120a-120c) may contain components of the system 100 and the devices may be connected over a network 199. The network 199 is representative of any type of communication network, including data and/or voice network, and may be implemented using wired infrastructure (e.g., cable, CAT5, fiber optic cable, etc.), a wireless infrastructure (e.g., WiFi, RF, cellular, microwave, satellite, Bluetooth, etc.), and/or other connection technologies. Devices may thus be connected to the network 199 through either wired or wireless connections. Network 199 may include a local or private network or may include a wide network such as the internet. For example, a speech controlled device 110*a*, a tablet computer 110*b*, a smart phone 110*c*, and a refrigerator 110*d* may be connected to the network 199 through a wireless service provider, over a WiFi or cellular network connection or the like. Other devices are included as network-connected support devices, such as laptop computer 120*a*, desktop computer 120*b*, and a server 120*c*. The support devices 120 may connect to the network 199 through a wired connection or wireless connection. Networked devices 110 may capture audio using one-or-more built-in or connected microphones 1118 or audio capture devices, with processing performed by ASR, NLU, or other components of the same device or another device connected via network 199, such as an ASR 250, NLU 260, etc. of one or more servers 120*c*.

The concepts disclosed herein may be applied within a number of different devices and computer systems, including, for example, general-purpose computing systems, speech processing systems, and distributed computing environments. Thus the modules, components and/or processes described above may be combined or rearranged without departing from the scope of the present disclosure. The functionality of any module described above may be allocated among multiple modules, or combined with a different module. As discussed above, any or all of the modules may be embodied in one or more general-purpose microprocessors, or in one or more special-purpose digital signal processors or other dedicated microprocessing hardware. One or more modules may also be embodied in software implemented by a processing unit. Further, one or more of the modules may be omitted from the processes entirely.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented as in firmware or hardware, such as the acoustic front end 256, which comprise among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each is present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for determining an utterance endpoint during automatic speech recognition (ASR) processing, the computer-implemented method comprising:
   receiving audio data comprising a first portion and a second portion, the audio data corresponding to an utterance;
   performing ASR processing on the first portion to determine a first interpretation;
   determining that the first interpretation includes a command;
   determining, using the first interpretation, a domain of the command;
   identifying a threshold quantity of consecutive non-speech audio frames corresponding to an endpoint corresponding to the domain;
   performing ASR processing on the second portion to determine a second interpretation;
   determining that the second portion includes a first quantity of consecutive non-speech audio frames;
   determining an expected pause duration based at least in part on the second interpretation;
   determining that the first quantity of consecutive non-speech audio frames exceeds the threshold quantity of consecutive non-speech audio frames;
   determining that the first quantity of consecutive non-speech audio frames exceeds the expected pause duration; and determining, based at least in part on the domain and the expected pause duration, an utterance endpoint in the audio data.

2. The computer-implemented method of claim 1, further comprising:
   determining that the audio data includes a second quantity of speech preceding the first quantity of consecutive non-speech audio frames; and
   identifying the threshold quantity of consecutive non-speech audio frames further using the second quantity.

3. The computer-implemented method of claim 1, further comprising:
   determining, for the first interpretation, a first pause duration; and
   determining, for the second interpretation, a second pause duration,
   wherein the expected pause duration is further determined by summing the first pause duration and the second pause duration.

4. The computer-implemented method of claim 3, further comprising:
   determining that the utterance includes a request to send a message;
   determining, using the utterance endpoint and the audio data, text data corresponding to the message; and
   sending the text data.

5. A computer-implemented method comprising:
   receiving first audio data representing speech;
   performing automatic speech recognition (ASR) processing on the first audio data to determine the speech represents a command;
   determining a domain corresponding to the command;
   determining, based at least in part on the domain, a threshold non-speech duration of audio data; and
   determining, based at least in part on the threshold non-speech duration, a speech endpoint in the first audio data.

6. The computer-implemented method of claim 5, wherein the first audio data comprises a first portion corresponding to a first part of an utterance and a second portion corresponding to a second part of the utterance, and the computer-implemented method further comprises:
   performing ASR processing on the first portion to determine first ASR output data;
   determining, based at least in part on the threshold non-speech duration, that an end of the utterance corresponds to an end of the second portion;
   performing ASR processing on the second portion to determine second ASR output data; and
   causing the command to be executed using at least one of the first ASR output data or the second ASR output data.

7. The computer-implemented method of claim 5, wherein the first audio data comprises a first portion corresponding to a first utterance and a second portion corresponding to a second utterance, and the computer-implemented method further comprises:
   determining that the first portion and second portion correspond to the command;
   performing ASR processing on the first portion to determine first ASR output data;
   determining, based at least in part on the threshold non-speech duration, that an end of the second utterance corresponds to an end of the second portion;
   performing ASR processing on the second portion to determine second ASR output data; and
   causing the command to be executed using at least one of the first ASR output data or the second ASR output data.

8. The computer-implemented method of claim 5, further comprising:
   determining a first non-speech duration in the first audio data;
   determining a first weight corresponding to the ASR processing of the first audio data;
   determining a first weighted non-speech duration using the first weight and the first non-speech duration; and
   determining an expected non-speech duration based at least in part on the first weighted non-speech duration.

9. The computer-implemented method of claim 8, further comprising:
   determining a second weighted non-speech duration,
   wherein determining the expected non-speech duration comprises summing the first weighted non-speech duration and the second weighted non-speech duration.

10. The computer-implemented method of claim 8, wherein determining the first non-speech duration comprises determining a number of consecutive non-speech audio frames in the first audio data.

11. The computer-implemented method of claim 10, wherein determining the number of consecutive non-speech audio frames comprises determining a number of consecutive non-speech nodes.

12. A computing system comprising:
   at least one processor; and
   a memory including instructions that, when executed by the at least one processor, cause the computing system to:
      receive first audio data representing speech;
      perform automatic speech recognition (ASR) processing on the first audio data to determine the speech represents a command;
      determine a domain corresponding to the command;
      determine, based at least in part on the domain, a threshold non-speech duration of audio data; and
      determine, based at least in part on the threshold non-speech duration, a speech endpoint in the first audio data.

13. The computing system of claim 12, wherein the first audio data comprises a first portion corresponding to a first part of an utterance and a second portion corresponding to a second part of the utterance, and wherein the memory further includes instructions that, when executed by the at least one processor, further cause the computing system to:
   perform ASR processing on the first portion to determine first ASR output data;
   determine, based at least in part on the threshold non-speech duration, that an end of the utterance corresponds to an end of the second portion;
   perform ASR processing on the second portion to determine second ASR output data; and
   cause the command to be executed using at least one of the first ASR output data or the second ASR output data.

14. The computing system of claim 12, wherein the first audio data comprises a first portion corresponding to a first utterance and a second portion corresponding to a second utterance, and wherein the memory further includes instructions that, when executed by the at least one processor, further cause the computing system to:
   determine that the first portion and second portion correspond to the command;

perform ASR processing on the first portion to determine first ASR output data;
determine, based at least in part on the threshold non-speech duration, that an end of the second utterance corresponds to an end of the second portion;
perform ASR processing on the second portion to determine second ASR output data; and
cause the command to be executed using at least one of the first ASR output data or the second ASR output data.

15. The computing system of claim 12, wherein the memory further includes instructions that, when executed by the at least one processor, further cause the computing system to:
determine a first non-speech duration in the first audio data;
determine a first weight corresponding to the ASR processing of the first audio data;
determine a first weighted non-speech duration using the first weight and the first non-speech duration; and
determine an expected non-speech duration based at least in part on the first weighted non-speech duration.

16. The computing system of claim 15, wherein the memory further includes instructions that, when executed by the at least one processor, further cause the computing system to:
determine a second weighted non-speech duration,
wherein determining the expected non-speech duration comprises summing the first weighted non-speech duration and the second weighted non-speech duration.

17. The computing system of claim 15, wherein the instructions to determine the first non-speech duration further comprise instructions that, when executed by the at least one processor, further cause the computing system to determine a number of consecutive non-speech audio frames in the first audio data.

18. The computing system of claim 17, wherein the instructions to determine the number of consecutive non-speech audio frames further comprise instructions that, when executed by the at least one processor, further cause the computing system to determine a number of consecutive non-speech nodes.

* * * * *